US006768817B1

(12) United States Patent
Cheng et al.

(10) Patent No.: US 6,768,817 B1
(45) Date of Patent: Jul. 27, 2004

(54) FAST AND EFFICIENT COMPUTATION OF CUBIC-SPLINE INTERPOLATION FOR DATA COMPRESSION

(75) Inventors: Tsen Chung Cheng, San Marino, CA (US); Truieu K. Truong, San Marino, CA (US); Irving S. Reed, Santa Monica, CA (US); Lung J. Wang, Kaohsiung (TW); Wen S. Hsieh, Kaohsiung (TW)

(73) Assignee: Truong, T.K./ Chen, T.C., San Marino, CA (US)

( * ) Notice: Subject to any disclaimer, the term of this patent is extended or adjusted under 35 U.S.C. 154(b) by 841 days.

(21) Appl. No.: 09/654,383

(22) Filed: Sep. 1, 2000

Related U.S. Application Data

(60) Provisional application No. 60/180,012, filed on Feb. 3, 2000, and provisional application No. 60/152,772, filed on Sep. 3, 1999.

(51) Int. Cl.[7] .................................................. G06K 9/36
(52) U.S. Cl. ..................................... 382/232; 382/248
(58) Field of Search ................................ 382/232, 242, 382/248, 251

(56) References Cited

U.S. PATENT DOCUMENTS

| 5,822,456 A | 10/1998 | Reed et al. | ................. 382/232 |
| 5,892,847 A | 4/1999 | Johnson | ..................... 382/232 |

OTHER PUBLICATIONS

Keys. "Cubic convolution interpolation for digital image processing". Acoustics, Speech, and Signal Processing, IEEE Transactions on, vol.: 29 Issue: 6, Dec. 1981, pp.: 1153–1160.*
International Preliminary Examination Report dated Sep. 18, 2001.

\* cited by examiner

*Primary Examiner*—Jon Chang
*Assistant Examiner*—Colin LaRose
(74) *Attorney, Agent, or Firm*—Christie, Parker & Hale, LLP

(57) ABSTRACT

A fast and efficient method and system for computation of cubic-spline interpolation for data compression is described. In one aspect, the present invention is a method and system for defining a cubic-spline filter; correlating the filter with the signal to obtain a correlated signal; autocorrelating the filter to obtain autocorrelated filter coefficients; computing a transform of the correlated signal and the autocorrelated filter coefficients; dividing the transform of the correlated signal by the transform of the autocorrelated filter coefficients to obtain a transform of a compressed signal; and computing an inverse transform of the transform of the compressed signal to obtain the compressed signal. The signal, the filter, and the transforms may be one dimensional or two dimensional. Further, the transforms may be a fast Fourier transform (FFT) or a Winograd discrete Fourier transform (WDFT) with an overlap-save scheme. Also, a zonal filter may be defined to simplify the steps of correlating and autocorrelating.

54 Claims, 13 Drawing Sheets

FAST AND EFFICIENT COMPUTATION OF CUBIC-SPLINE INTERPOLATION FOR DATA COMPRESSION

CROSS REFERENCE TO RELATED APPLICATIONS

This patent application claims the benefit of the filing date of U.S. Provisional Patent Applications Serial Nos. 60/152, 772, filed Sep. 3, 1999 and entitled "FAST AND EFFICIENT COMPUTATION OF CUBIC-SPLINE INTERPOLATION IN IMAGE CODEC," and 60/180,012, filed Feb. 3, 2000 and entitled "FAST AND EFFICIENT COMPUTATION OF CUBIC-SPLINE INTERPOLATION IN IMAGE CODEC," the entire contents of which are hereby expressly incorporated by reference.

FIELD OF THE INVENTION

This invention relates to data compression. More specifically, the invention relates to a new cubic-spline interpolation (CSI) for both 1-D and 2-D signals to sub-sample signal and image compression data.

BACKGROUND OF THE INVENTION

In most multimedia systems the amount of image data is so large that the use of image data compression is almost mandatory. Image data compression allows the image to be transmitted over the Internet in real time. Also it reduces the requirements for image storage. Presently both spatial and temporal data reduction techniques are available and continue to improve the performance of image data compression. The fundamental problem of image data compression is to increase the compression ratio and to reduce the computational complexity within an acceptable fidelity.

Interpolation is one of the more important functions that can be used in the process of estimating the intermediate values of a set of discrete sampling points. Interpolation is used extensively in image data compression to magnify or reduce images and to correct spatial distortions. For example, see R. G. Keys, "Cubic Convolution Interpolation for Digital Image Processing," IEEE Trans. on Acoustics, Speech, and Signal Processing, vol. ASSP-29, no.6, pp. 1153–1160, December 1981, [1], the contents of which are hereby expressly incorporated by reference. In general, the process of decreasing the data rate is called decimation and the process of increasing data samples is called interpolation as described in H. S. Hou, and H. C. Andrews, "Cubic Splines for Image Interpolation and Digital Filtering," IEEE Trans. on Acoustics, Speech, and Signal Processing, vol. ASSP-26, no.6, pp.508–517, December 1978, [2], the contents of which are hereby expressly incorporated by reference.

It is well known that several interpolation functions such as linear interpolation (see, W. K. Pratt, Digital Image Processing, second edition, John Wiley & Sons, Inc., New York, 1991, [3], the contents of which are hereby expressly incorporated by reference.) cubic-convolution interpolation (see [1], and [3]), cubic B-spline interpolation (described to C. de Boor, A Practical Guide to Splines. New York: Springer-Verlag, 1978, [4]; M. Unser, A. Aldroubi, and M. Eden, "B-Spline Signal Processing: Part II-Efficient Design and Applications," IEEE Trans. on Signal Processing, vol.41, pp.834–848, February 1993, [5]; M. Unser, A. Aldroubi, and M. Eden, "Enlargement or Reduction of Digital Images with Minimum Loss of Information," IEEE Trans. on Image Processing, vol.4, pp.247–258, March 1995, [6]; and [2]) can be used in the image data compression process.

The disadvantage of these interpolation schemes is that in general they are not designed to minimize the error between the original image and its reconstructed image. In 1981 Reed (I. S. Reed, Notes on Image Data Compression Using Linear Spline Interpolation, Department of Electrical Engineering, University of Southern California, Los Angeles, Calif., 90089-2565, U.S.A., November 1981 [7], the contents of which are hereby incorporated by reference) and in 1998 Reed and Yu (I. S. Reed and A. Yu, Optimal Spline Interpolation for Image Compression, U.S. Pat. No. 5,822,456, Oct. 13, 1998 [8], the contents of which are hereby incorporated by reference) developed a linear spline interpolation scheme for re-sampling the image data. This linear spline interpolation is based on the least-squares method with the linear interpolation function.

Using an extension of the ideas of Reed in [7,8], a modified linear spline interpolation algorithm, called the cubic-spline interpolation (CSI) algorithm, is developed in this invention for the sub-sampling of image data. (The linear spline interpolation explained in [8]and used by America On Line™ (AOL) will be called the "AOL algorithm" in this document from hereon.)

It follows from [1]that the cubic-convolution interpolation, which is different from the B-spline interpolation, can be performed much more efficiently than that of the cubic B-spline interpolation method. In this invention, the new CSI scheme combines the least-squares method with a cubic-spline function developed by Keys [1]for the decimation process. Also the cubic-spline reconstruction is used in the interpolation process. Therefore, the CSI constitutes a new scheme that is quite different from both cubic B-spline interpolation [2,–6]and cubic-convolution interpolation [1,3].

The concept of the CSI for both 1-D and 2-D signals is describes and demonstrated in the following sections. In addition, it is shown by computer simulation that the CSI scheme obtains a better subjective quality for the reconstructed image than linear interpolation, cubic-convolution interpolation, cubic B-spline interpolation and linear spline interpolation. An important advantage of this new CSI scheme is that it can be computed by a use of the FFT technique. The complexity of the calculation of the CSI scheme is substantially less than other conventional means.

W. B. Pennebaker and J. L. Mitchell, JPEG Still Image Data Compression Standard, Van Nostrand Reinhold, New York, 1993, [9], the contents of which are hereby incorporated by reference, describes the JPEG still image data compression standard. It is well known that the JPEG (see [9]) algorithm is the international compression standard for still-images. The disadvantage of the conventional JPEG algorithm is that it causes visually disturbing blocking effects when high quantization parameter is used to obtain a high compression ratio. One embodiment of this invention includes a simpler and modified JPEG encoder-decoder to improve the JPEG standard with a high compression ratio and still maintain a good quality reconstructed image.

Recently, the authors in T. K. Truong, L. J. Wang, I. S. Reed, W. S. Hsieh, and T. C. Cheng "Image data compression using cubic convolution spline interpolation," accepted for publication in IEEE Transactions on Image Processing [10], the contents of which are hereby incorporated by reference, proposed the modified JPEG encoder-decoder for $\tau=2$ that utilizes the CSI scheme with a compression ratio of 4 to 1 as a pre-processing stage of the JPEG encoder and the cubic-spline reconstruction with a ratio of 1 to 4 as a post-processing stage of the inverse JPEG decoder to achieve a high compression ratio.

In such a modified JPEG encoder the CSI scheme is the pre-processing stage of the JPEG encoder. It can be implemented by the use of the FFT algorithm. In addition, the output of the modified JPEG encoder represents the compressed data to be transmitted. It can be pre-computed and stored. In such a modified JPEG decoder, the cubic-spline reconstruction constitutes the post-processing stage of the JPEG decoder. This post-processing stage is different from the conventional post-processing algorithms that were proposed to reduce the blocking effects of block-based coding in B. Ramamurthi and A. Gersho, "Nonlinear space variant post-processing of block coded images," *IEEE Trans. on Acoustics, Speech, Signal Processing*, vol. ASSP-34, pp.1258–1267, 1986, [11], Y. Yang, N. Galatsanos, and A. Katsaggelos, "Projection-based spatially adaptive reconstruction of block-transform compressed images," *IEEE Trans. on Image Processing*, vol.4, pp.896–908, July 1995 [12], the contents of which are hereby incorporated by reference.

The proposed post-processing stage is an interpolation process that uses the cubic-convolution interpolation. In [10], a computer simulation shows that the modified JPEG encoder-decoder for $\tau=2$ obtains a better subjective quality and an objective PSNR of the reconstructed image than the JPEG algorithm described in T. Lane, Independent JPEG Group's free JPEG software, 1998, [13], the contents of which are hereby incorporated by reference; and [9]. Furthermore, the modified inverse JPEG decoder requires less computational time than the conventional JPEG decoder. But, the disadvantage of the modified JPEG encoder-decoder for $\tau=2$ is that the computational time required for the modified JPEG encoder is greater than the conventional JPEG encoder.

Thus, in one aspect, the present invention describes a fast method to compute the modified JPEG encoder. It is shown in this aspect of the invention that the speed of the new method for computing the modified JPEG encoder is approximately two times faster than that of the conventional JPEG encoder with still a good quality of reconstructed image.

SUMMARY OF THE INVENTION

The present invention describes a new cubic-spline interpolation (CSI) for both 1-D and 2-D signals to sub-sample signal and image compression data. This new interpolation scheme which is based on the least-squares method with a cubic-spline function can be implemented by the fast Fourier transform (FFT), and/or by a Winograd discrete Fourier transform (WDFT). The result is a simpler and faster interpolation design than can be obtained by conventional means. It is shown by computer simulation that such a new CSI yields the most accurate algorithms for smoothing. Linear interpolation, linear spline interpolation, cubic-convolution interpolation and cubic B-spline interpolation tend to be inferior in performance. In addition it is shown in this invention that the CSI scheme can be performed by a fast and efficient computation. The proposed method uses a simpler technique in the decimation process. It requires substantially fewer additions and multiplications than the original CSI algorithm.

In one aspect, the present invention is a method and system for defining a cubic-spline filter; correlating the filter with the signal to obtain a correlated signal; autocorrelating the filter to obtain autocorrelated filter coefficients; computing a transform of the correlated signal and the autocorrelated filter coefficients; dividing the transform of the correlated signal by the transform of the autocorrelated filter coefficients to obtain a transform of a compressed signal; and computing an inverse transform of the transform of the compressed signal to obtain the compressed signal. The signal, the filter, and the transforms may be one dimensional or two dimensional. Further, the transforms may be a fast Fourier transform (FFT) or a Winograd discrete Fourier transform (WDFT) with an overlap-save scheme. Also, a zonal filter may be defined to simplify the steps of correlating and autocorrelating.

Furthermore, a new type of overlap-save scheme can be utilized to solve the boundary-condition problems that occur between two neighboring sub-images in the actual image for higher compression ratios. It is also shown in this invention that a very efficient 9-point Winograd discrete Fourier transform (WDFT) can be used to replace the FFT needed to implement the CSI scheme image for higher compression ratio of 9 to 1. Finally, a fast new CSI algorithm is used along with the Joint Photographic Experts Group (JPEG) standard to design a modified JPEG encoder-decoder for image data compression. As a consequence, for the higher compression ratios the proposed modified JPEG encoder-decoder obtains a better quality of reconstructed image and also requires less computational time than both the conventional JPEG method and the America on Line (AOL) algorithm.

BRIEF DESCRIPTION OF THE DRAWINGS

The objects, advantages and features of this invention will become more apparent from a consideration of the following detailed description and the drawings, in which.

DETAILED DESCRIPTION

Figure 1:
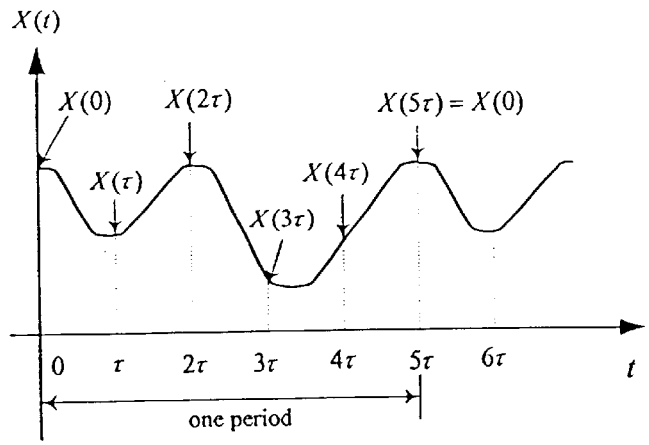
FIG. 1 is an exemplary periodic function with a period of $\tau=5$.

The present invention describes a new cubic-spline interpolation (CSI) for both 1-D and 2-D signals to sub-sample signal and image compression data. This new interpolation scheme which is based on the least-squares method with a cubic-spline function can be implemented by the fast Fourier transform (FFT). Furthermore, in one embodiment of the present invention, a new type of overlap-save scheme is utilized to solve the boundary-condition problems that occur between two neighboring sub-images in the actual image for higher compression ratios. In one embodiment of this invention, an efficient 9-point Winograd discrete Fourier transform (WDFT) is used to replace the FFT needed to implement the CSI scheme image for higher compression ratio of 9 to 1. Finally, a fast new CSI algorithm is used along with the Joint Photographic Experts Group (JPEG) standard to design a modified JPEG encoder-decoder for image data compression.

In order to speed up the modified JPEG encoder for τ=2 with a good image quality, the compression ratio of the CSI scheme is extended to 9 to 1 (τ=3). However, if the compression ratio for the CSI scheme is increased, there is need for additional computations that involve considerably more additions and multiplications. Therefore, in this invention a new faster and efficient algorithm for CSI is developed. The basic idea of this new algorithm, called the fast cubic-spline interpolation (FCSI) scheme, is based on the CSI scheme, but it has a simpler form than that used for the original CSI scheme. The FCSI scheme substantially reduces the complexity of the additional computations that are required for the increased compression ratio. Moreover, the constants α, β, γ and δ, used to compute the terms $A_{j_1 j_2, k_1 k_2}$ for the new FCSI scheme, are accurately calculated in detail in this invention.

For τ=3, the actual image to be compressed, a novel overlap-save sub-image method is used to solve for the needed boundary conditions. Also a simplified and efficient algorithm that uses a 9-point Winograd DFT (WDFT) instead of the FFT is implemented to compress an actual image. Computer runs show that for some gray images of size 512 by 512, the computational time of the FCSI encoder that is implemented by a new type of overlap-save sub-image method and the 9-point Winograd DFT on a 400-MHz Intel Pentium II personal computer using C-code can be dramatically reduced.

The FCSI encoder requires only around 0.15 sec when compared with around 0.57 sec for the original CSI encoder at a compression ratio of 9 to 1 (τ≅3). Also, the new FCSI scheme obtains a PSNR that is similar to all of the other more complicated zonal filters considered in this invention. Finally, this FCSI scheme with τ=3 is combined with the JPEG standard to speed up the modified JPEG encoder for color image coding and still obtain a better quality of reconstructed image than the JPEG algorithm for higher compression ratios. In other words, the modified JPEG encoder for τ=3 requires 0.71 sec, 0.38 sec and 0.67 sec less time than the modified JPEG encoder for τ=2 [10], the conventional JPEG encoder [13] and the AOL algorithm [8], respectively.

This document is organized as follows: In Section II the encoding algorithm for this new interpolation method is derived in detail. In additio, it is shown now that the properties of the FFT and the convolution theorem can be used to compute the CSI scheme. The decoding algorithm is explained in Section III. In Section IV the FCSI computation is described. The constants needed for the FCSI are calculated in Section V. A novel FCSI algorithm that uses a new type of overlap-save sub-image technique and the Winograd DFT algorithm is developed in Section VI. In Section VII the modified JPEG encoder-decoder is presented. Finally, experimental results are presented in Section VIII.

II. Encoding Algorithm for the New Interpolation Method

Encoding with the CSI scheme, utilizes the decimation process needed to perform image data compression. The philosophy of the CSI scheme is to recalculate the sampled values of the signal or image data by means of the least-squares method using the cubic-spline function. It is shown in this section that this new proposed method applies to both 1-D and 2-D signals as follows:

A. CSI for the 1-D Signal

Figure 2:
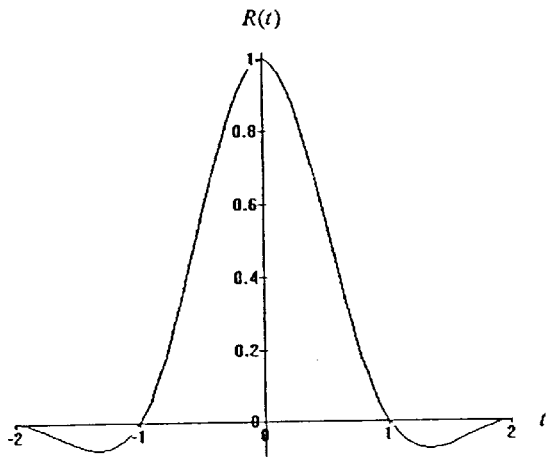
FIG. 2 is an exemplary 1-D cubic-spline function.

Let τ be a fixed, positive integer. Also let the data function X(t) be periodic with period nτ, where n is an integer. An example of X(t) for n=5 is illustrated in FIG. 1. From [1], the 1-D cubic-spline function R(t), shown in FIG. 2, is defined by $$R(t) = \begin{cases} (3/2)|t|^3 - (5/2)|t|^2 + 1 & , 0 \le |t| < 1 \\ -(1/2)|t|^3 + (5/2)|t|^2 - 4|t| + 2 & , 1 \le |t| < 2 \\ 0 & , 2 \le |t| \end{cases} \quad (1)$$

Next one needs to define the shift function of the cubic-spline function R(t) as follows:

$$\Psi_k(t) = R(t - k\tau) \text{ for } 0 \le k \le n=31 \ 1. \quad (2)$$

Figure 3:
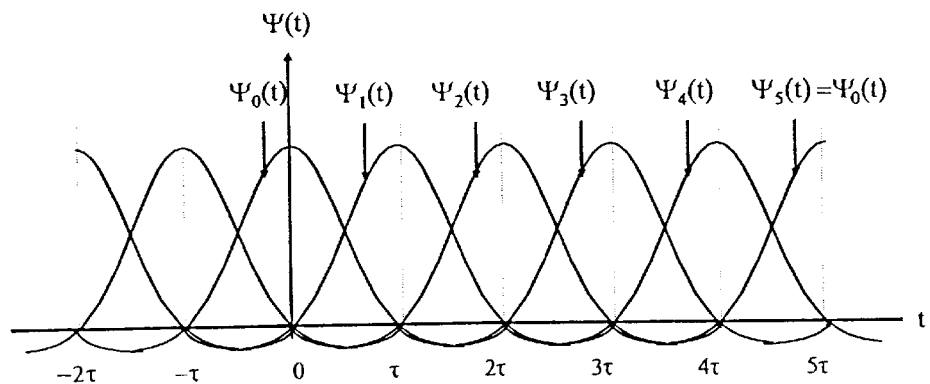
FIG. 3 is an exemplary shifted cubic-spline function for N=6.

An example of the shift functions $\Psi_k(t)$ for n=6 is shown in FIG. 3. The goal is to approximate X(t) by a n-point sum, given by $$S(t) = \sum_{k=0}^{n-1} X_k \Psi_k(t) = \sum_{k=0}^{n-1} X_k R(r - k\tau) \quad (3)$$

in a least-squares fashion, where $X_0, \ldots, X_{n-1}$ are the reconstructed values at the sampling points which represent the compressed data to be transmitted or stored. The function S(t) in (3) is cubic-spline reconstruction of the function X(t) using the weights $X_0, \ldots, X_{n-1}$. It follows from [7] that the least-squares approximation of S(t) to X(t) is defined by $$L(X_0, X_1, \ldots X_{n-1}) = \sum_{t=-2\tau}^{n\tau} (X(t) - S(t))^2 \tag{4}$$

$$= \sum_{t=-2\tau}^{n\tau} \left(X(t) - \sum_{k=0}^{n-1} X_k \Psi_k(t)\right)^2,$$

where the sum is taken over one period $n\tau$ plus $2\tau$ of the data. FIG. 1 shows an exemplary periodic function with a period $5\tau$, FIG. 2 is an exemplary 1-D cubic-spline function, and FIG. 3 is an exemplary shifted cubic-spline function for n=6.

Using the same procedure, described in [7,8], one can find the weights $X_0, X_1, \ldots, X_{n-1}$ in (4) that minimize the function $L(X_0, X_1, \ldots X_{n-1})$. To minimize (4) partial differentiation of $(X_0, X_1, \ldots X_{n-1})$ with respect to $X_j$ for $0 \leq j \leq n-1$ yields the following set of equations:

$$\frac{\partial L(X_0, X_1, \ldots X_{n-1})}{\partial X_j} = \sum_{t=-2\tau}^{n\tau} 2\left(X(t) - \sum_{k=0}^{n-1} X_k \Psi_k(t)\right) \cdot \Psi_j(t) = 0, \text{ or} \tag{5}$$

$$\sum_{k=0}^{n-1} A_{j,k} X_k = Y_j \text{ for } 0 \leq j \leq n-1,$$

where $$A_{j,k} = \sum_{t=-2\tau}^{n\tau} \Psi_k(t)\Psi_j(t) \text{ for } 0 \leq j, k \leq n-1, \text{ and} \tag{6}$$

$$Y_j = \sum_{t=-2\tau}^{n\tau} X(t)\Psi_j(t) \text{ for } 0 \leq j \leq n-1. \tag{7}$$

The term $Y_j$ in (7) can be reduced as follows:

$$Y_j = \sum_{t=-2\tau}^{n\tau} X(t)R(t - j\tau) = \sum_{t=(j-2)\tau}^{(j+2)\tau} X(t)R(t - j\tau). \tag{8}$$

Let $r-j\tau=m$, then $$Y_j = \sum_{m=-2\tau+1}^{2\tau-1} X(m + j\tau)R(m). \tag{9}$$

Note that computing $Y_j$ in (9) involves n correlation coefficients of only $3\tau-1$ points. Now let the periodicity of the cubic-spline function be $R(t)=R(t+n\tau)$, i.e., R(t) has a period of $n\tau$. Then the matrix form of $A_{j,k}$ in (6) can be simplified to:

$$A_{j,k} = \sum_{m=-2\tau+1}^{2\tau-1} R(m + (j-k)\tau)R(m) \tag{10}$$

$$= \begin{cases} \sum_{m=-2\tau+1}^{2\tau-1} (R(m))^2 = \alpha & \text{if } j-k \equiv 0 \mod n \\ \sum_{m=-2\tau+1}^{2\tau-1} R(m + \tau)R(m) = \beta & \text{if } j-k \equiv \pm 1 \mod n \\ \sum_{m=-2\tau+1}^{2\tau-1} R(m + 2\tau)R(m) = \gamma & \text{if } j-k \equiv \pm 2 \mod n \\ \sum_{m=-2\tau+1}^{2\tau-1} R(m + 3\tau)R(m) = \delta & \text{if } j-k \equiv \pm 3 \mod n \\ 0 & \text{otherwise} \end{cases}$$

It follows from [7] that $A_{j,k}$ in (10) can be expressed in circulant form by letting $$A_{j,k} = B_{(k-j)_n} \tag{11}$$

where $(k-j)_n$ denotes the residue (k-j) modulo n, and $$B_0=\alpha, B_1=\beta, B_2=\gamma, B_3=\delta, B_4=0, \ldots, B_{n-4}=0, B_{n-3}=\delta, B_{n-2}=\gamma, B_{n-1}=\beta \tag{12}$$

Therefore, $A_{j,k}$ in (11) and (12) has the following symmetric, circulant representation:

$$A = [A_{j,k}] = \begin{pmatrix} B_0 & B_1 & B_2 & B_3 & 0 & \ldots & 0 & B_{n-3} & B_{n-2} & B_{n-1} \\ B_{n-1} & B_0 & B_1 & B_2 & B_3 & 0 & \ldots & 0 & B_{n-3} & B_{n-2} \\ B_{n-2} & B_{n-1} & B_0 & B_1 & B_2 & B_3 & 0 & \ldots & 0 & B_{n-3} \\ \vdots & \vdots & \vdots & \vdots & \vdots & \vdots & \vdots & \ddots & & \vdots \\ B_1 & B_2 & B_3 & 0 & \ldots & 0 & B_{n-3} & B_{n-2} & B_{n-1} & B_0 \end{pmatrix} \tag{13}$$

$$= \begin{pmatrix} \alpha & \beta & \gamma & \delta & 0 & \ldots & 0 & \delta & \gamma & \beta \\ \beta & \alpha & \beta & \gamma & \delta & 0 & \ldots & 0 & \delta & \gamma \\ \gamma & \beta & \alpha & \beta & \gamma & \delta & 0 & \ldots & 0 & \delta \\ \vdots & \vdots & \vdots & \vdots & \vdots & \vdots & \vdots & \vdots & \ddots & \vdots \\ \beta & \gamma & \delta & 0 & \ldots & 0 & \delta & \gamma & \beta & \alpha \end{pmatrix}$$

A substitution of (13) into (5) yields the matrix equation, $$A \cdot X = Y, \tag{14}$$

where the matrix A is given in (13), $X = (X_0, X_1, \ldots, X_{n-1})^T$ and $(Y_0, Y_1, \ldots, Y_{n-1})^T$.

Since the n×n matrix on the left side of (14) is a circulant matrix, (14) reduces immediately to $$Y_j = \sum_{k=0}^{n-1} X_k B_{(k-j)_n} \text{ for } 0 \leq j \leq n-1. \tag{15}$$

But $B_i = B_{n-i}$ for $i=1,2,\ldots,\lfloor n/2 \rfloor$, where $\lfloor x \rfloor$ denotes the greatest integer less than or equal to x. Thus (15) becomes $$Y_j = \sum_{k=0}^{n-1} X_k B_{(j-k)_n} \text{ for } 0 \leq j \leq n-1. \tag{16}$$

In (16) the FFT can be used to solve for the $X_k$. To see this, let the FFT of $Y_j$, $X_k$ and $B_j$ for $0 \leq j,k,m \leq n-1$ be defined by $\tilde{Y}_m$, $\tilde{X}_m$ and $\tilde{B}_m$, respectively. By using the convolution theorem describes in E. O. Brigham, *The Fast Fourier Transform and its Application*, Prentice-Hall International, Inc., Englewood Cliffs, N.J., 1988[14]; and A. V. Oppenheim, and R. W. Schafer, *Digital Signal Processing*, Prentice-Hall, Inc., Englewood Cliffs, N.J., 1975[15], the contents of which are hereby expressly incorporated be reference, it is easy to see that the solution of (16) in the frequency domain can be expressed as $\tilde{Y}_m = \tilde{X}_m \cdot \tilde{B}_m$ or $\tilde{X}_m = \tilde{Y}_m / \tilde{B}_m$, where $\tilde{B}_m \neq 0$. Thus, using the inverse FFT of $\tilde{X}_m$, the $X_k$ can be obtained for $0 \leq k \leq n-1$.

The encoding method for the 1-D signal is summarized as follows:

Choose a suitable value of integer τ. The compression ratio is roughly τ.

Apply (9) to find $Y_j$. Also apply (10), (11) and (12) to find $B_j$.

Find the FFT of $Y_j$ and $B_j$ to obtain $\tilde{Y}_m$ and $\tilde{B}_m$, respectively. Also compute $\tilde{X}_m = \tilde{Y}_m / \tilde{B}_m$.

Take the inverse FFT of $\tilde{X}_m$ to get $X_k$ which is the compressed data to be transmitted or stored.

B. CSI for the 2-D Signal

Figure 4:
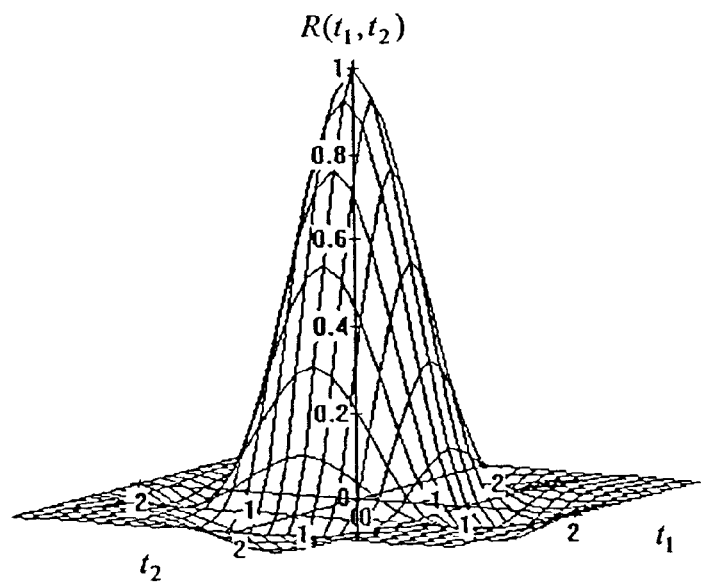
FIG. 4 is an exemplary side view of a 2-D cubic-spline function.

Let $X(t_1,t_2)$ be a doubly periodic signal (e.g., image) of periods $n_1\tau$ and $n_2\tau$ with respect to integer variables $t_1$ and $t_2$ where $n_1$ and $n_2$ are also integers. A 2-D cubic-spline function, $R(t_1 \cdot t_2)$, is defined by $$R(t_1,t_2) = R(t_1) \cdot R(t_2), \tag{17}$$

where $R(t_1)$ and $R(t_2)$ are 1-D cubic-spline functions, respectively. A 3-D plot of this cubic-spline function is shown in FIG. 4. It is well known fact that 2-D interpolation can be accomplished by the use of 1-D interpolations with respect to each coordinate [1,3].

By analogy with the 1-D case, let $$\Psi_{k_1,k_2}(t_1,t_2) = R(t_i-d_1,\tau,t_2-k_2\tau) = R(t_1-k_1\tau) \cdot R(t_2-k_2\tau) \text{ for } 0 \leq k_i \leq n_i-1 \text{ and } l=1,2. \tag{18}$$

By a procedure similar to that used in the 1-D case in (3), one defines the 2-D CSI as follows:

$$S(t_1, t_2) = \sum_{k_1=0}^{n_1-1} \sum_{k_2=0}^{n_2-1} X_{k_1,k_2} \Psi_{k_1,k_2}(t_1, t_2), \tag{19}$$

where $X_{k_1,k_2}$ are the reconstructed values at sampling points which represent the compressed image to be transmitted or stored. Again one wants to find the best weights $X_{k_1,k_2}$ such that $$L(X_{k_1,k_2}) = \sum_{t_1=-2\tau}^{n_1\tau} \sum_{t_2=-2\tau}^{n_2\tau} \left( X(t_1, t_2) - \sum_{k_1=0}^{n_1-1} \sum_{k_2=0}^{n_2-1} X_{k_1,k_2} \Psi_{k_1,k_2}(t_1, t_2) \right)^2 \tag{20}$$

is a minimum. It follows from [7] that minimizing (20) yields $$\frac{\partial L(X_{k_1 k_2})}{\partial X_{j_1,j_2}} = \tag{21}$$

$$\sum_{t_1=-2\tau}^{n_1\tau} \sum_{t_2=-2\tau}^{n_2\tau} 2 \left( X(t_1, t_2) - \sum_{k_1=0}^{n_1-1} \sum_{k_2=0}^{n_2-1} X_{k_1 k_2} \Psi_{k_1 k_2}(t_1, t_2) \right) \Psi_{j_1,j_2}(t_1, t_2) = 0,$$

$$\text{or} \sum_{k_1=0}^{n_1-1} \sum_{k_2=0}^{n_2-1} X_{k_1 k_2} A_{j_1 j_2,k_1 k_2} = Y_{j_1,j_2}, 0 \leq j_i \leq n_i - 1 \text{ and } i = 1, 2.$$

where $$A_{j_1 j_2,k_1 k_2} = \sum_{t_1=-2\tau}^{n_1\tau} \sum_{t_2=-2\tau}^{n_2\tau} \Psi_{j_1,j_2}(t_1, t_2) \Psi_{k_1,k_2}(t_1, t_2), \tag{22}$$

$$0 \leq j_i, k_i \leq n_i - 1 \text{ and } i = 1, 2, \text{ and}$$

$$Y_{j_1,j_2} = \sum_{t_1=-2\tau}^{n_1\tau} \sum_{t_2=-2\tau}^{n_2\tau} X(t_1, t_2) \Psi_{j_1,j_2}(t_1, t_2), \tag{23}$$

$$0 \leq j_i \leq n_i - 1 \text{ and } i = 1, 2.$$

The term $Y_{j_1,j_2}$ in (23) reduces as follows:

$$Y_{j_1,j_2} = \sum_{t_1=-2\tau}^{n_1\tau} \sum_{t_2=-2\tau}^{n_2\tau} X(t_1, t_2) R(t_1 - j_1\tau, t_2 - j_2\tau) \tag{24}$$

$$= \sum_{t_1=(j_1-2)\tau}^{(j_1+2)\tau} \sum_{t_2=(j_2-2)\tau}^{(j_2+2)\tau} X(t_1, t_2) R(t_1 - j_1\tau, t_2 - j_2\tau)$$

Let $t_k - j_k\tau = m_k$ for $k=1,2$, then $$Y_{j_1,j_2} = \sum_{m_1=-2\tau+1}^{2\tau-1} \sum_{m_2=-2\tau+1}^{2\tau-1} X(m_1 + j_1\tau, m_2 + j_2\tau) R(m_1, m_2), \tag{25}$$

where $R(m_1, m_2)$ is the 2-D cubic-spline function shown in FIG. 4. The terms $A_{j_1 j_2,k_1 k_2}$ in (22) are treated in a similar fashion as follows:

$$A_{j_1 j_2, k_1 k_2} = \sum_{m_1=-2\tau+1}^{2\tau-1} \sum_{m_2=-2\tau+1}^{2\tau-1} R(m_1 + (j_1 - k_1)\tau, m_2 + (j_2 - k_2)\tau) R(m_1, m_2) \quad (26)$$

$$= \begin{cases} \sum_{m_1,m_2=-2\tau+1}^{2\tau-1} (R(m_1, m_2))^2 = \alpha & \text{if } j_1 - k_1 \equiv 0 \bmod n_1 \text{ and } j_2 - k_2 \equiv 0 \bmod n_2 \\[6pt] \sum_{m_1,m_2=-2\tau+1}^{2\tau-1} R(m_1 \pm \tau, m_2) R(m_1, m_2) = \beta & \text{if } j_1 - k_1 \equiv \pm 1 \bmod n_1 \text{ and } j_2 - k_2 \equiv 0 \bmod n_2 \\ & \text{or } j_1 - k_1 \equiv 0 \bmod n_1 \text{ and } j_2 - k_2 \equiv \pm 1 \bmod n_2 \\[6pt] \sum_{m_1,m_2=-2\tau+1}^{2\tau-1} R(m_1 \pm 2\tau, m_2) R(m_1, m_2) = \gamma & \text{if } j_1 - k_1 \equiv \pm 2 \bmod n_1 \text{ and } j_2 - k_2 \equiv 0 \bmod n_2 \\ & \text{or } j_1 - k_1 \equiv 0 \bmod n_1 \text{ and } j_2 - k_2 \equiv \pm 2 \bmod n_2 \\[6pt] \sum_{m_1,m_2=-2\tau+1}^{2\tau-1} R(m_1 \pm 3\tau, m_2) R(m_1, m_2) = \delta & \text{if } j_1 - k_1 \equiv \pm 3 \bmod n_1 \text{ and } j_2 - k_2 \equiv 0 \bmod n_2 \\ & \text{or } j_1 - k_1 \equiv 0 \bmod n_1 \text{ and } j_2 - k_2 \equiv \pm 3 \bmod n_2 \\[6pt] \sum_{m_1,m_2=-2\tau+1}^{2\tau-1} R(m_1 \pm \tau, m_2 \pm \tau) R(m_1, m_2) = \eta & \text{if } j_1 - k_1 \equiv \pm 1 \bmod n_1 \text{ and } j_2 - k_2 \equiv \pm 1 \bmod n_2 \\[6pt] \sum_{m_1,m_2=-2\tau+1}^{2\tau-1} R(m_1 \pm 2\tau, m_2 \pm \tau) R(m_1, m_2) = \lambda & \text{if } j_1 - k_1 \equiv \pm 2 \bmod n_1 \text{ and } j_2 - k_2 \equiv \pm 1 \bmod n_2 \\ & \text{or } j_1 - k_1 \equiv \pm 1 \bmod n_1 \text{ and } j_2 - k_2 \equiv \pm 2 \bmod n_2 \\[6pt] \sum_{m_1,m_2=-2\tau+1}^{2\tau-1} R(m_1 \pm 3\tau, m_2 \pm \tau) R(m_1, m_2) = \mu & \text{if } j_1 - k_1 \equiv \pm 3 \bmod n_1 \text{ and } j_2 - k_2 \equiv \pm 1 \bmod n_2 \\ & \text{or } j_1 - k_1 \equiv \pm 1 \bmod n_1 \text{ and } j_2 - k_2 \equiv \pm 3 \bmod n_2 \\[6pt] \sum_{m_1,m_2=-2\tau+1}^{2\tau-1} R(m_1 \pm 2\tau, m_2 \pm 2\tau) R(m_1, m_2) = \rho & \text{if } j_1 - k_1 \equiv \pm 2 \bmod n_1 \text{ and } j_2 - k_2 \equiv \pm 2 \bmod n_2 \\[6pt] \sum_{m_1,m_2=-2\tau+1}^{2\tau-1} R(m_1 \pm 3\tau, m_2 \pm 2\tau) R(m_1, m_2) = \sigma & \text{if } j_1 - k_1 \equiv \pm 3 \bmod n_1 \text{ and } j_2 - k_2 \equiv \pm 2 \bmod n_2 \\ & \text{or } j_1 - k_1 \equiv \pm 2 \bmod n_1 \text{ and } j_2 - k_2 \equiv \pm 3 \bmod n_2 \\[6pt] 0 & \text{otherwise} \end{cases}$$

From Eq. (26) given above, the array $A_{j_1 j_2, k_1 k_2}$ can be expressed in 2-D circulant form as follows:

$$A_{j_1 j_2, k_1 k_1} = B_{(k_1 - j_1)_{n_1}, (k_2 - j_2)_{n_2}}, \quad (27)$$

where $(k_i - j_i)_{n_i}$ denotes the residue $(k_i - j_i)$ modulo $n_i$ for $i = 1, 2$ and $$[B_{s_1, s_2}] = \begin{pmatrix} B_{0,0} & B_{0,1} & B_{0,2} & B_{0,3} & 0 & \cdots & 0 & B_{0,n_2-3} & B_{0,n_2-2} & B_{0,n_2-1} \\ B_{1,0} & B_{1,1} & B_{1,2} & B_{1,3} & 0 & \cdots & 0 & B_{1,n_2-3} & B_{1,n_2-2} & B_{1,n_2-1} \\ B_{2,0} & B_{2,1} & B_{2,2} & B_{2,3} & 0 & \cdots & 0 & B_{2,n_2-3} & B_{2,n_2-2} & B_{2,n_2-1} \\ B_{3,0} & B_{3,1} & B_{3,2} & 0 & 0 & \cdots & 0 & 0 & B_{3,n_2-2} & B_{3,n_2-1} \\ 0 & 0 & 0 & 0 & 0 & \cdots & 0 & 0 & 0 & 0 \\ \vdots & \vdots & \vdots & \vdots & \vdots & \ddots & \vdots & \vdots & \vdots & \vdots \\ 0 & 0 & 0 & 0 & 0 & \cdots & 0 & 0 & 0 & 0 \\ B_{n_1-3,0} & B_{n_1-3,1} & B_{n_1-3,2} & 0 & 0 & \cdots & 0 & 0 & B_{n_1-3,n_2-2} & B_{n_1-3,n_2-1} \\ B_{n_1-2,0} & B_{n_1-2,1} & B_{n_1-2,2} & B_{n_1-2,3} & 0 & \cdots & 0 & B_{n_1-2,n_2-3} & B_{n_1-2,n_2-2} & B_{n_1-2,n_2-1} \\ B_{n_1-1,0} & B_{n_1-1,1} & B_{n_1-1,2} & B_{n_1-1,3} & 0 & \cdots & 0 & B_{n_1-1,n_2-3} & B_{n_1-1,n_2-2} & B_{n_1-1,n_2-1} \end{pmatrix} \quad (28)$$

-continued $$\begin{pmatrix} \alpha & \beta & \gamma & \delta & 0 & \ldots & 0 & \delta & \gamma & \beta \\ \beta & \eta & \lambda & \mu & 0 & \ldots & 0 & \mu & \lambda & \eta \\ \gamma & \lambda & \rho & \sigma & 0 & \ldots & 0 & \sigma & \rho & \lambda \\ \delta & \mu & \sigma & 0 & 0 & \ldots & 0 & 0 & \sigma & \mu \\ 0 & 0 & 0 & 0 & 0 & \ldots & 0 & 0 & 0 & 0 \\ \vdots & \vdots & \vdots & \vdots & \vdots & \ddots & \vdots & \vdots & \vdots & \vdots \\ 0 & 0 & 0 & 0 & 0 & \ldots & 0 & 0 & 0 & 0 \\ \delta & \mu & \sigma & 0 & 0 & \ldots & 0 & 0 & \sigma & \mu \\ \gamma & \lambda & \rho & \sigma & 0 & \ldots & 0 & \sigma & \rho & \lambda \\ \beta & \eta & \lambda & \mu & 0 & \ldots & 0 & \mu & \lambda & \eta \end{pmatrix},$$

where $0 \leq s_i \leq n_i-1$ for $i=1,2$. Note that if the array $[B_{s_1,s_2}]$ is represented in matrix form, it is a block-circulant matrix. FIG. 4 is the side view of the 2-D cubic-spline function.

Since the matrix $[B_{s_1,s_2}]$ in (28) is a block-circulant matrix, (21) can be expressed by $$Y_{j_1,j_2} = \sum_{k_1=0}^{n_1-1} \sum_{k_2=0}^{n_2-1} X_{k_1,k_2} B_{(k_1-j_1)_{n_1},(k_2-j_2)_{n_2}}, \quad (29)$$

$$0 \leq j_i \leq n_i - 1 \text{ and } i = 1, 2,$$

where $(k_i-j_i)_{n_i}$ denotes $(k_i-j_i)$ mod $n_i$ for $i=1,2$. Using a procedure similar to that used in (16), then (29) becomes $$Y_{j_1,j_2} = \sum_{k_1=0}^{n_1-1} \sum_{k_2=0}^{n_2-1} X_{k_1,k_2} B_{(j_1-k_1)_{n_1},(j_2-k_2)_{n_2}}, \quad (30)$$

$$0 \leq j_i \leq n_i - 1 \text{ and } i = 1, 2.$$

In (30) the 2-D FFT [14,15] can be used to solve for the $X_{k_1,k_2}$. Let the 2-D FFT of $Y_{j_1,j_2}$, $X_{k_1,k_2}$ and $B_{s_1,s_2}$ for $0 \leq j_i, k_i \leq n_i-1$ and $0 \leq s_i \leq n_i-1$, $i=1,2$ be defined, respectively, by $\tilde{Y}_{m,n}$, $\tilde{X}_{m,n}$ and $\tilde{B}_{m,n}$ for $0m \leq n_1-1$, $0 \leq n \leq n_2-1$. Then Eq. (30) in the frequency domain can be expressed as $\tilde{Y}_{m,n} = \tilde{X}_{m,n} \cdot \tilde{B}_{m,n}$ or $\tilde{X}_{m,n} = \tilde{Y}_{m,n}/\tilde{B}_{m,n}$, where $\tilde{B} \neq 0$. Finally, using the 2-D function of the inverse FFT of $\tilde{X}_{m,n}$, the $X_{k_1,k_2}$ are obtained for $0 \leq k_i-1$, $i=1,2$ The encoding method for the 2-D signal is summary in the following steps:

Choose a suitable value of integer $\tau$. The compression ratio is roughly $\tau^2$.

Apply (25) to find $Y_{j_1,j_2}$. Next, apply (26), (27) and (28) to find $B_{s_1,s_2}$.

Take the 2-D FFT of $Y_{j_1,j_2}$ and $B_{s_1,s_2}$ to obtain $\tilde{Y}_{m,n}$ and $\tilde{B}_{m,n}$, respectively. Also compute $\tilde{X}_{m,n} = \tilde{Y}_{m,n}/\tilde{B}_{m,n}$.

Take the inverse FFT of $\tilde{X}_{m,n}$ to obtain $X_{k_1,k_2}$ which is the compressed image to be transmitted or stored.

III. Decoding Algorithm

In the decoding process, using the reconstructed values at the sampling points (e.g., $X_k$ and $X_{k_1,k_2}$) obtained in Section II, the reconstructed points between the sampling points are obtained by means of the cubic-spline function. This decoding algorithm is called the cubic-spline reconstruction.

A. Decoding of the compressed 1-D Signal

Figure 5:
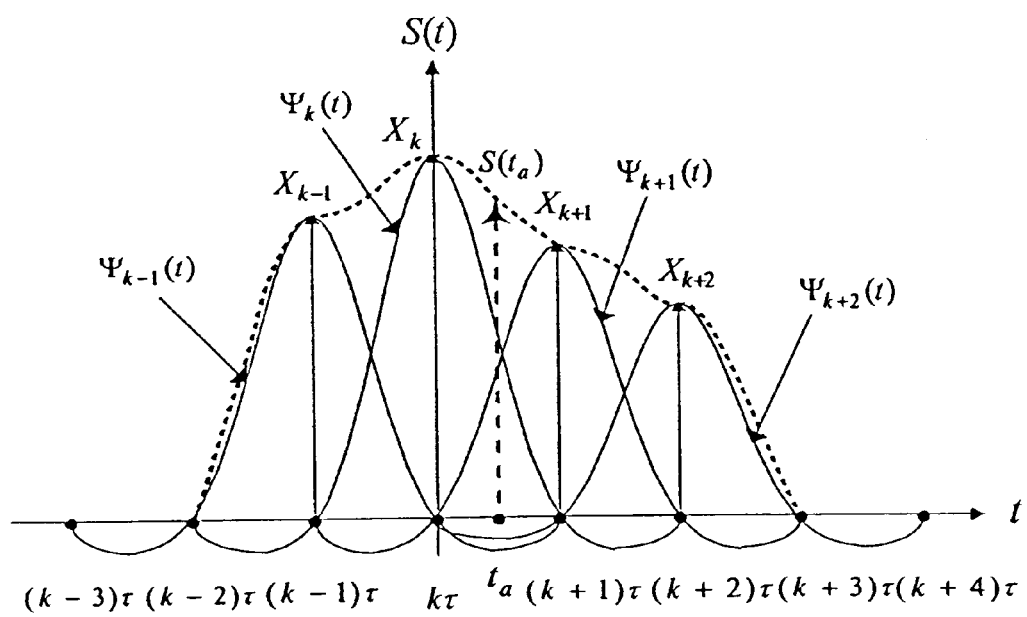
FIG. 5 is an exemplary reconstructed function between sampling periods.

Since the n reconstruction values $X_0, \ldots, X_{n-1}$ are known, the reconstructed signal $S(t)$ can be obtained by the use of (3). In other words, the retrieved signal is the convolution of the cubic-spline function $R(t)$, defined in (1), and the sequence of n reconstructed values with sampling interval $\tau$. The reconstructed function $S(t_a)$ between the two adjacent reconstructed values $X_k$ and $X_{k+1}$ is illustrated in FIG. 5 and given by the sum, $$S(t_a) = X_{k-1}\Psi_k(t_a) + X_k\Psi_k(t_a) + X_{k+1}\Psi_{k+1}(t_a) + X_{k+2}\Psi_{k+2}(t_a), \quad (31)$$

where $k\tau < t_a < (k+1)\tau$ and $\Psi_k(t)$ is defined in (2) and the boundary conditions as given in [1] are $X_{-1} = 3(X_0 - X_1) + X_2$ and $X_n = 3(X_{n-1} - X_{n-2}) + X_{n-3}$. FIG. 5 is a reconstructed function between the sampling points.

B. Decoding of the compressed 2-D Signal

Since the reconstruction values $X_{k_1,k_2}$ for $0 \leq k_i \leq n_i-1$, $i=1,2$ are known, the 2-D reconstructed image $S(t_1,t_2)$ can be obtained by the use of (19). In other words, the retrieved image is the 2-D convolution of the 2-D cubic-spline function $R(t_1,t_2)$, given in (17), and the 2-D sampled waveform $X_{k_1,k_2}$. It is well known that the computationally simpler method described in [3], called bilinear interpolation, can be used also to perform the 2-D interpolation. The ideas of the bilinear interpolation can be used to accomplish the 2-D cubic-spline reconstruction. In other words, the discrete data of each row can be interpolated from the reconstructed values $X_{k_1,k_2}$ with similar interpolation for the given discrete data of each column. It is easy to show that the reconstructed image $S(t_i,t_j)$ between the four adjacent reconstructed values is given by $$S(t_i, t_j) = \sum_{m=-1}^{2} \sum_{n=-1}^{2} X_{k_1+m,k_2+n} \Psi_{k_1+m,k_2+n}(t_i, t_j), \quad (32)$$

where $k_1\tau < t_i(k_1+1)\tau$, $k_2\tau < t_j < (k_2+1)\tau$ and the boundary conditions as given in [1] are $X_{-1,k_2} = 3(X_{0,k_1} - X_{1,k_2}) + X_{2,k_2}$, $X_{n,k_2} = 3(X_{n-1,k_2} - X_{n-2,k_2}) + X_{n-3,k_2}$, $X_{k_1,-1} = 3(X_{k_1,0} - X_{k_1,1}) +$ $k_1,2$, $X_{k_1,n} = 3(X_{k_1,n-1} - X_{k_1,n-2}) + X_{k_1,n-3}$, $X_{-1,-1} = 3(X_{0,-1} - X_{1,-1}) + X_{2,-1}$, $X_{n,-1} = 3(X_{n-1,-1} - X_{n-2,-1}) + X_{n-3,-1}$, $X_{-1,n} = 3(X_{0,n} - X_{1,n}) + X_{2,n}$, $X_{n,n} = 3(X_{n-1,n} - X_{n-2,n}) + X_{n-3,n}$.

IV. FAST COMPUTATION OF CSI

In fact, the CSI scheme needs a large number of pixels of the 2-D cubic-spline function $R(t_1, t_2)$ in order to compute the $Y_{1,j_2}$ in (25) and the $A_{j_1,j_2,k_1,k_2}$ in (26). For example, computing each $Y_{j_1,j_2}$ in (25) and $A_{j_1,j_2,k_1,k_2}$ in (26) for $\tau=2$ (compression ratio 4:1) and $\tau=3$ (compression ratio 9:1) involve 81 and 169 pixels of the domain of function $R(t_1, t_2)$, respectively. As a consequence, the complexity of the calculation of (25) and (26) needed in the CSI scheme is substantially increased when the compression ratio is extended from $\tau=2$ to $\tau=3$.

To illustrate this, for $\tau=3$ some abbreviated solutions are used to overcome the above problem of extra computational complexity. First, one defines a zonal mask of 169 pixels of $R(t_1, t_2)$ shown in FIG. 6(a), called zonal filter 1. This means that to compute each $Y_{j_1, j_2}$ in (25) one needs to use a zonal mask of 169 pixels of $R(t_1, t_2)$ to correlate with a periodic image, $X(t_1,t_2)$. Also, to calculate each $A_{j_1 t_2, k_1 k_2}$ in (26) one needs to use the 169 pixels for the function $R(t_1,t_2)$ to autocorrelate with the other 169 pixels of $R(t_1,t_2)$.

Figure 6:
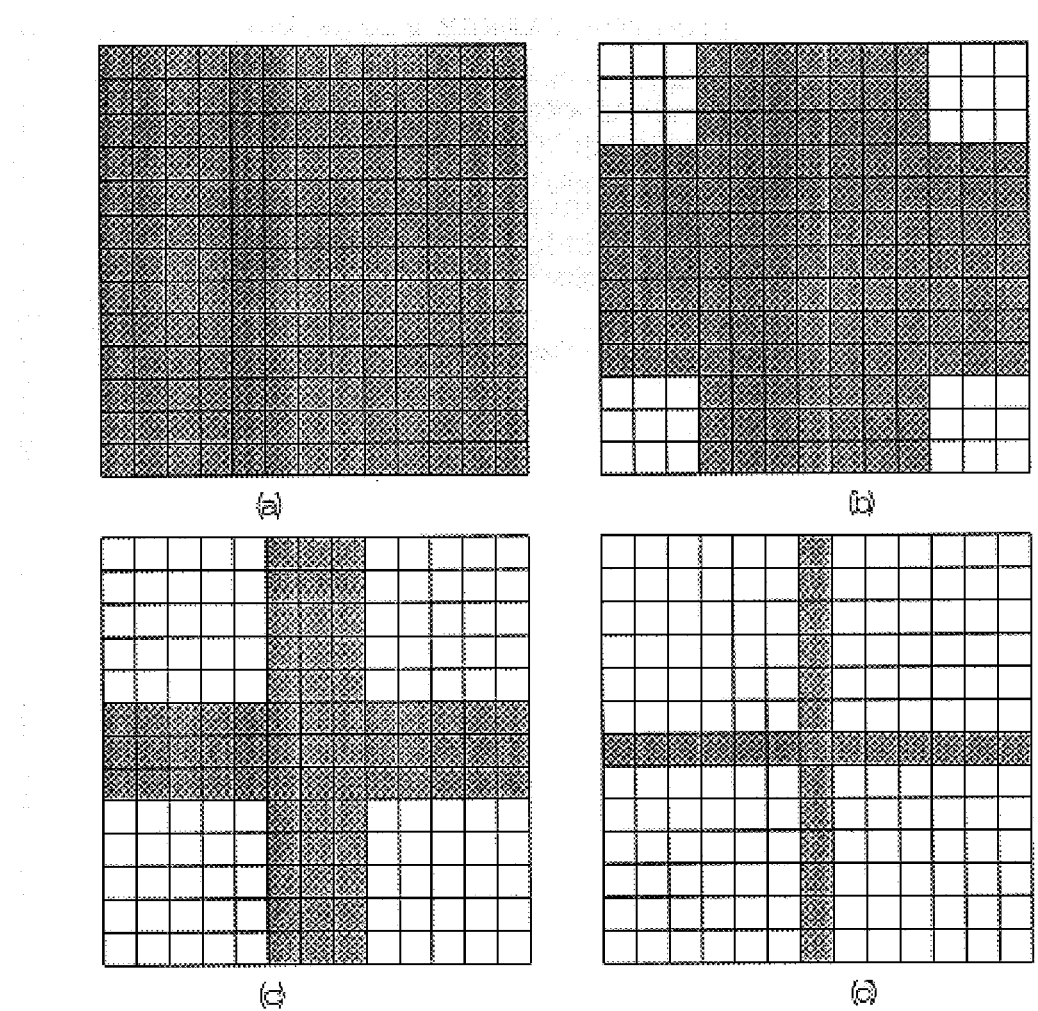
FIGS. 6(a)–(d) are exemplary zonal masks of the 2-D cubic-spline function used in the computation of $Y_{j_1,j_2}$ in (25) and $A_{j_1,j_2,k_1,k_2}$ in (26) for the CSI scheme.

FIGS. 6(a)–(d) are zonal masks of the 2-D cubic-spline function used in the computation of $Y_{j_1,j_2}$ in (25) and $A_{j_1 j_2, k_1 k_2}$ in (26) for the CSI scheme. FIG. 6(a) shows a 169 pixels in zonal filter 1, FIG. 6(b) shows a 133 pixels in zonal filter 2, FIG. 6(c) shows a 69 pixels in zonal filter 3, and FIG. 6(d) shows a 25 pixels in zonal filter 4. In order to reduce the computational complexity of this zonal filter 1, it is proposed next to use the zonal filter 2, shown in FIG. 6(b), the zonal filter 3, shown in FIG. 6(c), and the zonal filter 4, shown in FIG. 6(d). These zonal filters 2, 3 and 4 use zonal masks of 133, 69 and 25 pixels or grid points of $R(t_1,t_2)$, respectively, to compute each $Y_{j_1,j_2}$ in (25) and each $A_{j_1 j_2, k_1 k_2}$ in (26).

Next for $\tau=3$, the FCSI schemes described above are developed by the use of zonal filter 2, zonal filter 3 and zonal filter 4. Following the same procedure, used in the previous section, the FCSI scheme for $\tau=3$ is obtained readily. First the derivations of these FCSI schemes for $\tau=3$ are developed by a means similar to that of the original CSI scheme for $\tau=2$ [10]. Only the terms $Y_{j_1,j_2}$ in (25) and in (26) for the FCSI schemes are slightly different from the original CSI scheme. Also in the FCSI scheme, the complexities of the terms Y and $A_{j_1 j_2, k_1 k_2}$ for zonal filter 2, zonal filter 3 and zonal filter 4 are summarized in Tables I and II and are described in the following:

1. By FIG. 6(a), the terms $Y_{j_1,j_2}$ and $A_{j_1 j_2, k_1 k_2}$ for zonal filter 1 are obtained completely in a manner similar to (25) and (26). It uses 169 pixels of $R(t_1, t_2)$ to compute each $Y_{j_1,j_2}$ and each $A_{j_1 j_2, k_1 k_2}$. This algorithm is very complex and is just the original CSI scheme.

2. By FIG. 6(b), the terms $A_{j_1 j_2, k_1 k_2}$ for zonal filter 2 are obtained, and the result is similar to (26), except that $\sigma=0$. Each $Y_{j_1,j_2}$ in (25) is computed for zonal filter 2 with 133 pixels of $R_{t_1,t_2}$. This algorithm still involves extensive computations.

3. By FIG. 6(c), the terms $A_{j_1 j_2, k_1 k_2}$ for zonal filter 3 are obtained, and the result is similar to (26), but for this case $\mu=0$ and $\sigma=0$. Each $_{j_1,j_2}$ in (25) is computed for zonal filter 3 with 69 pixels of $R_{(t_1, t_2)}$. This algorithm is also complex.

4. By FIG. 6(d), the terms $A_{j_1 j_2, k_1 k_2}$ for zonal filter 4 are obtained, and the result is similar to (26), but in this case $\eta=\lambda=\rho=\mu=\sigma=0$. Each $Y_{j_1,j_2}$ in (25) is computed for zonal filter 4 by the use of only 25 pixels of $R(t_1,t_2)$. This algorithm is more compact than any of the other computations given above in cases 1, 2 and 3.

TABLE I

COMPLEXITY OF $A_{j_1 j_2, k_1 k_2}$ USING FOUR ZONAL FILTERS.

| $A_{j_1 j_2, k_1 k_2}$ | Zonal Filter 1 | Zonal Filter 2 | Zonal Filter 3 | Zonal Filter 4 |
|---|---|---|---|---|
| α | non-zero | non-zero | non-zero | non-zero |
| β | non-zero | non-zero | non-zero | non-zero |
| γ | non-zero | non-zero | non-zero | non-zero |
| δ | non-zero | non-zero | non-zero | non-zero |
| η | non-zero | non-zero | non-zero | zero |
| λ | non-zero | non-zero | non-zero | zero |
| ρ | non-zero | non-zero | non-zero | zero |
| μ | non-zero | non-zero | zero | zero |
| σ | non-zero | zero | zero | zero |

TABLE II

COMPLEXITY OF COMPUTING $Y_{j_1,j_2}$ WITH A COMPRESSION RATIO OF 9 TO 1 FROM AN IMAGE OF SIZE 512 BY 512 USING FOUR ZONAL FILTERS.

| $Y_{j_1,j_2}$ | Zonal Filter 1 | Zonal Filter 2 | Zonal Filter 3 | Zonal Filter 4 |
|---|---|---|---|---|
| Number of Pixels | 169 | 133 | 69 | 25 |
| Number of Additions | 4,912,488 | 3,859,812 | 1,988,388 | 701,784 |
| Number of Multiplications | 818,748 | 643,302 | 380,133 | 204,687 |

It is shown by computer runs in Section VIII that the zonal filter 4 obtains a PSNR that is similar to any of the other three zonal filters. Thus, this zonal filter 4 represents the most practical and simple zonal filter for the FCSI scheme. The primary advantage of the FCSI scheme with zonal filter 4 over the original CSI scheme is that it substantially reduces the computational complexity.

V. Calculation of Constants

In accord with (27), (28) and the previous section the terms $A_{j_1 j_2, k_1 k_2}$ needed for zonal filter 4 are given by the general formula:

$$A_{j_1 j_2, k_1 k_2} = \begin{cases} \sum_{m_1,m_2=-2\tau+1}^{2\tau-1} (R(m_1,m_2))^2 = \alpha & \text{if } j_1 - k_1 \equiv 0 \bmod n_1 \text{ and } j_2 - k_2 \equiv 0 \bmod n_2 \\ \sum_{m_1,m_2=-2\tau+1}^{2\tau-1} R(m_1 \pm \tau, m_2)R(m_1, m_2) = \beta & \text{if } j_1 - k_1 \equiv \pm 1 \bmod n_1 \text{ and } j_2 - k_2 \equiv 0 \bmod n_2 \\ & \text{or } j_1 - k_1 \equiv 0 \bmod n_1 \text{ and } j_2 - k_2 \equiv \pm 1 \bmod n_2 \\ \sum_{m_1,m_2=-2\tau+1}^{2\tau-1} R(m_1 \pm 2\tau, m_2)R(m_1, m_2) = \gamma & \text{if } j_1 - k_1 \equiv \pm 2 \bmod n_1 \text{ and } j_2 - k_2 \equiv 0 \bmod n_2 \\ & \text{or } j_1 - k_1 \equiv 0 \bmod n_1 \text{ and } j_2 - k_2 \equiv \pm 2 \bmod n_2 \\ \sum_{m_1,m_2=-2\tau+1}^{2\tau-1} R(m_1 \pm 3\tau, m_2)R(m_1, m_2) = \delta & \text{if } j_1 - k_1 \equiv \pm 3 \bmod n_1 \text{ and } j_2 - k_2 \equiv 0 \bmod n_2 \\ & \text{or } j_1 - k_1 \equiv 0 \bmod n_1 \text{ and } j_2 - k_2 \equiv \pm 3 \bmod n_2 \\ 0 & \text{otherwise} \end{cases}$$

or by the array, $$[B_{s_1,s_2}] = \begin{pmatrix} \alpha & \beta & \gamma & \delta & 0 & \ldots & 0 & \delta & \gamma & \beta \\ \beta & 0 & 0 & 0 & 0 & \ldots & 0 & 0 & 0 & 0 \\ \gamma & 0 & 0 & 0 & 0 & \ldots & 0 & 0 & 0 & 0 \\ \delta & 0 & 0 & 0 & 0 & \ldots & 0 & 0 & 0 & 0 \\ 0 & 0 & 0 & 0 & 0 & \ldots & 0 & 0 & 0 & 0 \\ \vdots & \vdots & \vdots & \vdots & \vdots & \ddots & \vdots & \vdots & \vdots & \vdots \\ 0 & 0 & 0 & 0 & 0 & \ldots & 0 & 0 & 0 & 0 \\ \delta & 0 & 0 & 0 & 0 & \ldots & 0 & 0 & 0 & 0 \\ \gamma & 0 & 0 & 0 & 0 & \ldots & 0 & 0 & 0 & 0 \\ \beta & 0 & 0 & 0 & 0 & \ldots & 0 & 0 & 0 & 0 \end{pmatrix} \qquad (33)$$

The constants $\alpha$, $\beta$, $\gamma$ and $\delta$ are the autocorrelation coefficients between the 2-D spline function $R(m_1, m_2)$. In the following analysis, $\tau$ and m are assumed to be integers and R(t) is the 1-D cubic-spline function, defined in (1). By the use of (33), one obtains constants $\alpha$, $\beta$, $\gamma$ and $\delta$ as follows:

1) Calculation of $\alpha$: By FIG. 7 for $\tau=3$, the value of $\alpha$ is the sum of the overlapping values of the 2-D saline function $R(m_1,m_2)$, given by $$\alpha = 1 + 4 \times \sum_{m=1}^{2\tau} R^2(m/\tau). \qquad (34)$$

2) Calculation of $\beta$: By FIG. 8 for $\tau=3$, the value of $\beta$, is the sum of the overlapping values of the 2-D spline function $R(m_1,m_2)$ and the shifted 2-D spline function $R(m_1+\tau, m_2)$, given by $$\beta = \sum_{m=1}^{\tau-1} R(m/\tau)R((\tau-m)/\tau) + 2 \times \sum_{m=0}^{\tau} R((\tau+m)/\tau)R(m/\tau). \qquad (35)$$

3) Calculation of $\gamma$: By FIG. 9 for $\tau=3$, the value of $\gamma$ is the sum of the overlapping values of the 2-D spline function $R(m_1,m_2)$ and the shifted 2-D spline function $R(m_1+2\tau, m_2)$, given by $$\gamma = \sum_{m=0}^{2\tau} R(m/\tau)R((2\tau-m)/\tau). \qquad (36)$$

4) Calculation of $\delta$: By FIG. 10 for $\tau=3$, the value of $\delta$ is the sum of the overlapping values of the 2-D spline function $R(m_1,m_2)$ and the shifted 2-D spline function $R(m_1+2\tau, m_2)$, given by $$\delta = \sum_{m=0}^{\tau} R((\tau+m)/\tau)R((2\tau-m)/\tau). \qquad (37)$$

Specifically for $\gamma=3$ the above equations yield the following parameters for $\alpha$, $\beta$, $\gamma$ and $\delta$:

$$\alpha = 1 + 4 \times \sum_{m=1}^{2 \times 3} R^2(m/3) = 3.8916,$$

$$\beta = \sum_{m=1}^{3-1} R(m/3)R((3-m)/3) + 2 \times \sum_{m=0}^{3} R((3+m)/3)R(m/3) = 0.3786,$$

$$\gamma = \sum_{m=0}^{2 \times 3} R(m/3)R((2 \times 3 - m)/3) = -0.1070,$$

$$\delta = \sum_{m=0}^{3} R((3+m)/3)R((2 \times 3 - m)/3) = 0.0055.$$

Figure 7:
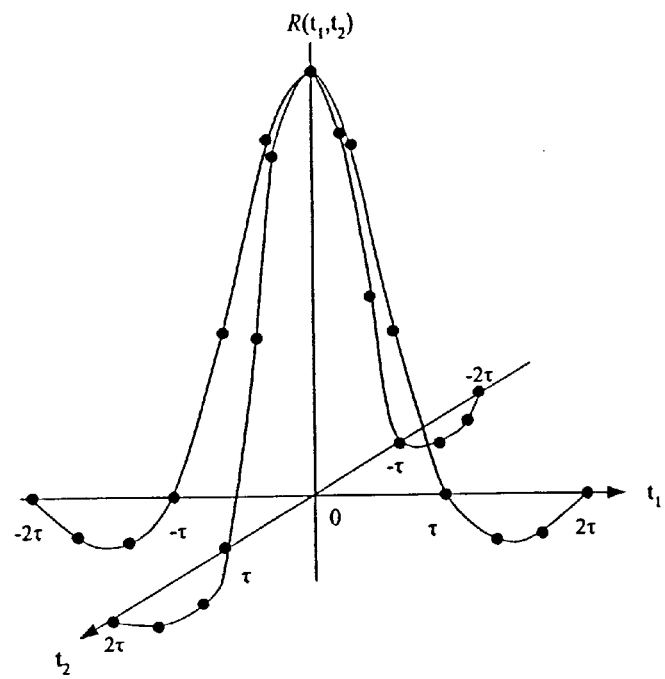
FIG. 7 is an exemplary overlap map grid points for calculating $\alpha$ for $\tau=3$.
Figure 8:
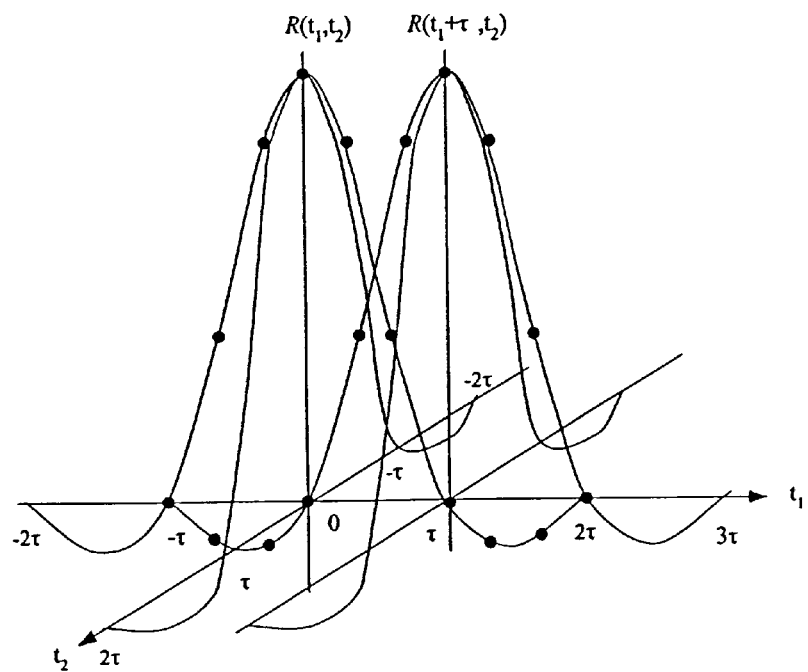
FIG. 8 is an exemplary overlap map grid points for calculating $\beta$ for $\tau=3$.
Figure 9:
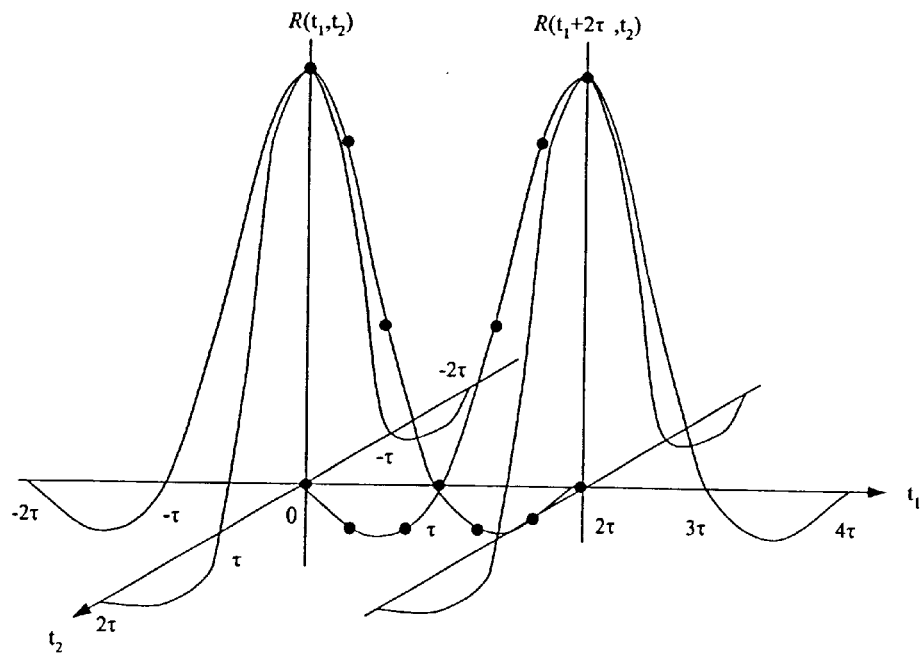
FIG. 9 is an exemplary overlap map grid points for calculating $\gamma$ for $\tau=3$.
Figure 10:
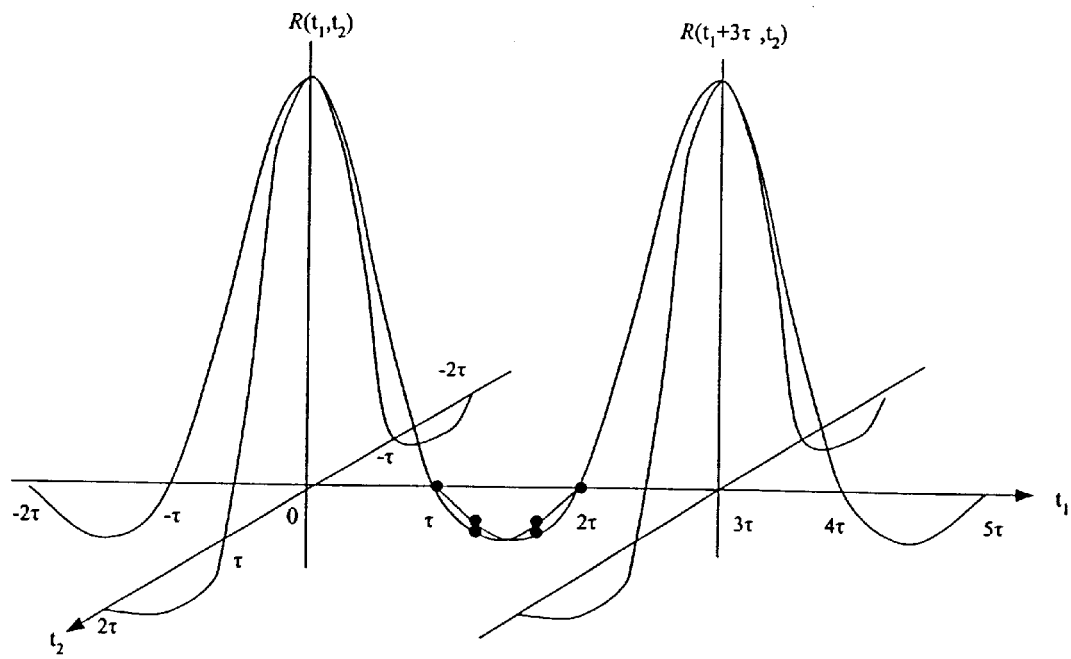
FIG. 10 is an exemplary overlap map grid points for calculating $\delta$ for $\tau=3$.

FIG. 7 shows the overlap map grid points for calculating $\alpha$ for $\gamma=3$, FIG. 8 shows the overlap map grid points for calculating $\beta$ for $\tau=3$, FIG. 9 shows the overlap map grid points for calculating $\gamma$ for $\tau=3$, and FIG. 10 shows the overlap map grid points for calculating $\delta$ for $\tau=3$.

VI. A Novel FCSI Algorithm Implemented by Winograd DFT and Overlap-save Method

The Winograd DFT algorithm described in Dean P. Kolba and Thomas W. Parks, "A prime factor FFT algorithm using high-speed convolution," *IEEE Trans. on Acoustic, Speech, and Signal Processing*, vol. ASSP-25, No.4, pp.281–294, August 1977, [16]; S. Winograd, "On computing the discrete Fourier transform," *Mathematics of Computation*, vol. 32, No.141, pp.175–199, January 1978, [17]; and I. S. Reed, T. K. Truong, R. L. Miller, and B. Benjauthrit, "Further results on fast transforms for decoding Reed-Solomon codes over $GF(2^n)$ for n=4, 5, 6, 8," in the Deep Space Network Progress Report 42–50, Jet Propulsion Laboratory, Pasadena, Calif., pp.132–155, January and February 1979. [18], the contents of which are hereby incorporated by reference, with a new type of overlap-save method is used in this section to implement the FCSI scheme for $\tau=3$.

Consider an image of size N×N=512×512 pixels. If the FCSI scheme for $\tau=3$ is used to compress this original image, the size of the compressed image is reduced to $\lceil 512/3\rceil \times \lceil 512/3\rceil = 171 \times 171$ pixels, where $\lceil x \rceil$ 9 denotes the least integer greater than or equal to x. Since 171 is not a power of two, the 2-D FFT can not be used to solve for the $X_{k_1,k_2}$ in (30). To overcome this problem, one possible method is to expand the data $Y_{j_1,j_2}$ in (25) and $B_{s_1,s_2}$ in (28), where $0 \leq j_i, s_i \leq n_i - 1$ for i =1,2 from 171×171 pixels to 256×256 pixels, by appending zeros to the edges of the original reduced image. Then one would take the 2-D FFT of $Y_{j_1,j_2}$ and $B_{s_1,s_2}$ obtain $\tilde{Y}_{m,n}$ and $\tilde{B}_{m,n}$, respectively. This would yield $\tilde{X}_{m,n} = \tilde{Y}_{m,n}/\tilde{B}_{m,n}$. Finally, one would take the inverse 2-D FFT of the $\tilde{X}_{m,n}$ to solve for the $X_{k_1,k_2}$, where $0 \leq k_1, k_2 \leq 255$, the compressed data to be transmitted or stored. The disadvantage of using such a 2-D FFT method to compute the CSI scheme for $\tau=3$ is that it requires more computational time due to the increase in the size of the data from 171×171 pixels to 256×256 pixels.

Figure 11:
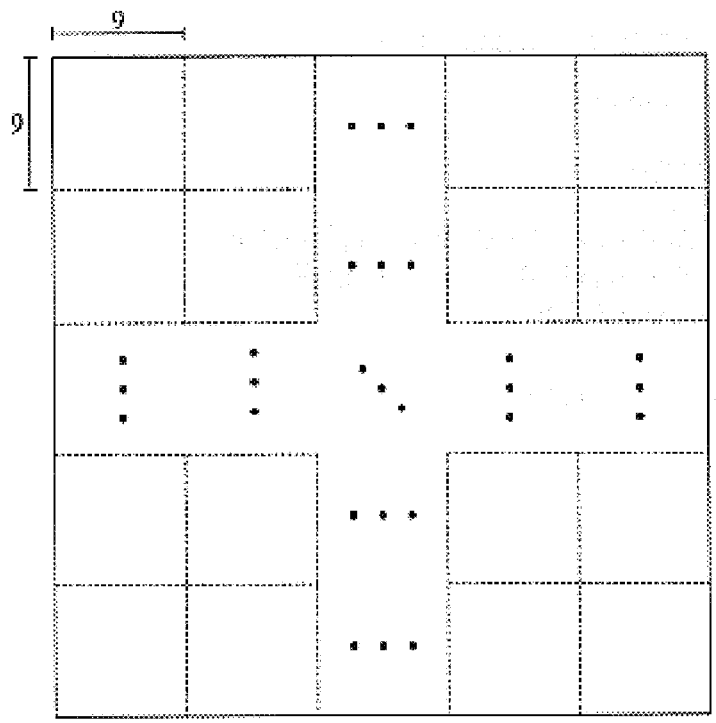
FIG. 11 is a 19×19 sub-images of size 9×9 in an exemplary image of size 171×171.

Since the size of the compressed data to be transmitted for r=3 is not always equal to a power of two, in order to compress such an odd-sized image, a 9-point Winograd DFT (WDFT) described below is used to implement the FCSI scheme. First since 171=9 ×19 the $Y_{j_1,j_2}$ and $B_{s_1,s_2}$, where $0 \leq j_2, s_1, s_2 \leq 170$, can be divided into 19×19 sub-images, each of size 9×9 pixels, shown in FIG. 11. One might think that the 2-D Fourier transform of each sub-image could be implemented directly by the use of the 9×9 WDFT algorithm, and that the 2-D Fourier transforms $\tilde{Y}_{m,n}$ and $\tilde{b}_{m,n}$ of the $Y_{j_1,j_2}$ and $B_{s_1,s_2}$ of size 171×171 could be obtained, respectively. In addition, the $\tilde{X}_{m,n}$ could be calculated from the $\tilde{Y}_{m,n}$ divided by the $\tilde{B}_{m,n}$.

Finally, one might expect that the inverse 2-D Fourier transform of $\tilde{X}_{m,n}$ could be obtained by the use of the 9×9

Figure 12:
FIG. 12 is a reconstructed image with serious artifacts that is generated by using FCSI method implemented by the direct use of the 9×9 Winograd DFT for compression.

WDFT algorithm. In other words, the reconstructed image of size 171×171 might be obtained. However, this inverse transform is found experimentally to have serious artifacts. This is seen in the reconstructed image, shown in FIG. 12. FIG. 12 illustrates a reconstructed image with serious artifacts that used FCSI method implemented by the direct use of the 9×9 Winograd DFT for compression. FIG. I 1 shows a 19×19 sub-images of size 9×9 in an exemplary image of size 171×171.

To remove the artifacts found in FIG. 12 by the direct use of the 9×9 WDFT compression described above, a novel type of overlap-save sub-image technique is applied to the FCSI method. An illustrative example of the FCSI algorithm is implemented first by the simplified 5×5 WDFT described below. This new type of overlap-save sub-image method is illustrated in this example, the block diagram of which is depicted in FIG. 13.

Figure 13:
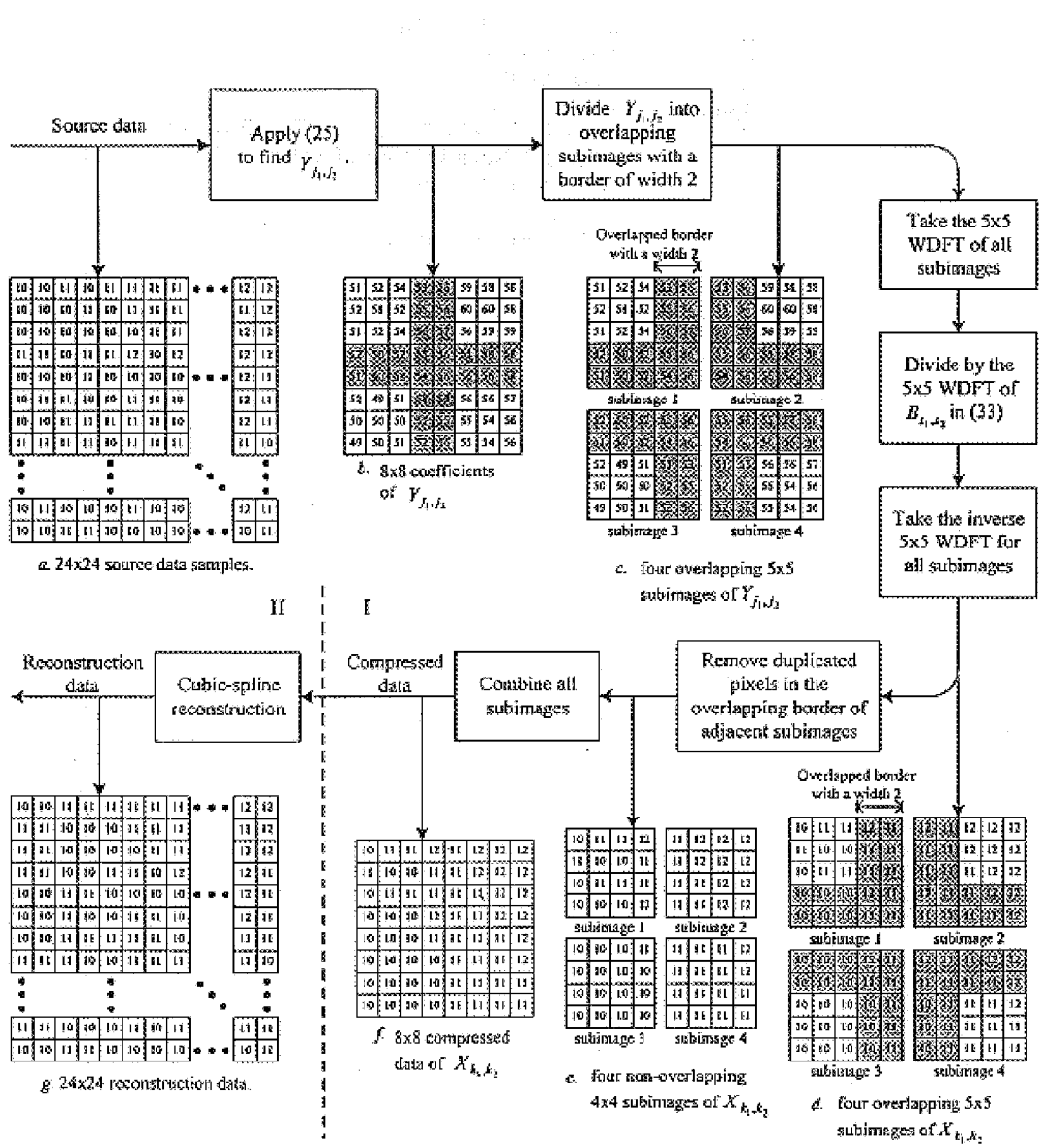
FIG. 13 is an illustrative example of the FCSI algorithm implemented by a 5×5 Winograd DFT and the overlap-save sub-image method.

FIG. 13 is a simple illustrative example of the FCSI algorithm implemented by the 5×5 Winograd DFT and the overlap-save sub-image method. The block diagram shown in FIG. 13 is separated into two parts as indicated by broken lines. The first part, labeled by "I", is a FCSI encoder that uses the 5×5 WDFT algorithm with the overlap-save sub-image technique, The second part, labeled by "II", is a FCSI decoder. In the first part, consider the source image data to be of size 24×24 pixels as shown in FIG. 13($a$). The use of (25) with zonal filter 4 for τ=3 yields the reduced image needed to obtain the coefficients $Y_{j_1,j_2}$ of size 8×8 pixels as depicted in FIG. 13($b$). Next these coefficients are divided into four overlapping 5×5 sub-images as shown in FIG. 13($c$). Note that each sub-image of size 5×5 pixels overlaps each adjacent sub-image with a border of width 2. It is shown experimentally that this border can be used to solve the boundary condition between the two neighboring sub-images when using the Winograd DFT algorithm.

As illustrated in FIG. 13, one uses the next three steps to transform the four overlapping 5×5 sub-images of $Y_{j_1,j_2}$ to the corresponding four overlapping 5×5 sub-images of $X_{k_1,k_2}$. The first step is to take the 5×5 WDFT of the four overlapping 5×5 sub-images of $Y_{j_1,j_2}$ to obtain the four transformed 5×5 corresponding sub-images of $\tilde{Y}_{m,n}$. The second step is to divide these four 5×5 sub-images of $\tilde{Y}_{m,n}$ by the 5×5 WDFT of $B_{s_1,s_2}$ in (33) or $\tilde{B}_{m,n}$ for τ=3 to obtain the four transforms of the 5×5 sub-images of $\tilde{X}_{m,n}$. The third step is to take the inverse 5×5 WDFT for these four 5×5 sub-images of $\tilde{X}_{m,n}$ to obtain finally the corresponding four overlapping 5×5 sub-images of $X_{k_1,k_2}$ as shown in FIG. 13($d$).

Because some of the pixels in the overlapping border of 5×5 sub-images of $X_{k_1,k_2}$ appear in the other adjacent 5×5 sub-images of $X_{k_1,k_2}$, the duplicated pixels in the four overlapping 5×5 sub-images of $X_{k_1,k_2}$ are deleted or removed. By this means the four overlapping 5×5 sub-images of $X_{k_1,k_2}$ become the four non-overlapping 4×4 sub-images of $X_{k_1,k_2}$. To illustrate this, in FIG. 13($d$) each 5×5 sub-image has an overlapping border of width 2; FIG. 13($e$) illustrates the remaining samples of each sub-image obtained by the use of this overlap-save method. In FIG. 13($d$), first consider all four sub-images with overlapping border in the column direction. Because of the end-effects, the last columns of sub-images 1 and 3 are the duplicated columns in the overlapping border to be removed.

However, in sub-images 2 and 4 in FIG. 13($d$), the first columns of these two sub-images are also duplicated columns in the overlapping border that need to be deleted. Finally, the above overlap-save method in the row direction is accomplished similarly to that of the column direction. A combination of these four non-overlapping 4×4 sub-images of $X_{k_1,k_2}$ yields the entire 8×8 image of $X_{k_1,k_2}$ shown in FIG. 13($f$). These $X_{k_1,k_2}$ image data are the compressed data to be transmitted or stored. In the second part, using the entire 8×8 $X_{k_1,k_2}$ compressed data, the 24×24 reconstructed data, shown in FIG. 13($g$), are obtained by means of the cubic-spline reconstruction function, given in (32).

Thus the steps included in compressing an image are defining a cubic-spline filter; correlating the filter with the signal to obtain a correlated signal; autocorrelating the filter to obtain autocorrelated filter coefficients; computing a transform of the correlated signal and the autocorrelated filter coefficients; dividing the transform of the correlated signal by the transform of the autocorrelated filter coefficients to obtain a transform of a compressed signal; and computing an inverse transform of the transform of the compressed signal to obtain the compressed signal.

In order to compress an actual image of size 512×512 by such an overlap-save sub-image method, the 9×9 WDFT instead of the 5×5 WDFT is used for the FCSI scheme. Then, the FCSI encoding algorithm using the 9×9 Winograd DFT and the overlap-save sub-image method is summarized in the following steps:

Choose τ=3. The compression ratio is roughly $τ^2$=9.

Apply (25) with zonal filter 4 to the original image of size 512×512 to find all of the 171×171 coefficients, Also apply (33) to find $B_{s_1,s_2}$. Then take the 9×9 WDFT of $B_{s_1,s_2}$ to obtain the 9×9 coefficients, $\tilde{B}_{m,n}$.

Divide all of the coefficients $Y_{j_1,j_2}$ into the appropriate overlapping 9×9 sub-images of $Y_{j_1,j_2}$ with a border of width 2.

Take the 9×9 WDFT of all overlapping 9×9 sub-images of $Y_{j_1,j_2}$ to obtain the transforms of the corresponding 9×9 sub-images of $\tilde{Y}_{m,n}$.

Compute $\tilde{X}_{m,n}=\tilde{Y}_{m,n}/\tilde{B}_{m,n}$ to obtain each 9×9 sub-image of $\tilde{X}_{m,n}$.

Take the inverse 9×9 WDFT of all of the 9×9 sub-images of $\tilde{X}_{m,n}$ to obtain the 9×9 sub-images of $X_{k_1,k_2}$.

Remove the duplicate pixels in the overlapping border of two adjacent 9×9 sub-images of $X_{k_1,k_2}$. By this means the overlapping sub-images of $X_{k_1,k_2}$ become the non-overlapping sub-images of $X_{k_1,k_2}$.

Combine each non-overlapping sub-image of $X_{k_1,k_2}$ to obtain the entire image of $\tilde{X}_{m,n}$, where $0 \leq k_1, k_2 \leq 511$. These image data $X_{k_1,k_2}$ are the compressed data to be transmitted or stored.

Figure 14:
FIG. 14 is a reconstructed image with no apparent artifacts that is generated by using a FCSI implemented by the 9×9 Winograd DFT and the overlap-save method for compression.

In the FCSI decoding algorithm, the compressed data $X_{k_1,k_2}$ constitutes the encoding algorithm; the reconstructed data are obtained by means of the cubic-spline reconstruction function in (32). Hence, by means of the above-described overlap-save sub-image technique, both the compressed and the reconstructed image are obtained and found experimentally to have no apparent artifacts, as shown in FIG. 14. FIG. 14 is a reconstructed image with no apparent artifacts that used the FCSI implemented by the 9×9 Winograd DFT and the overlap-save method for compression.

VII. A Modified JPEG Encoder-Decoder

Figure 15:
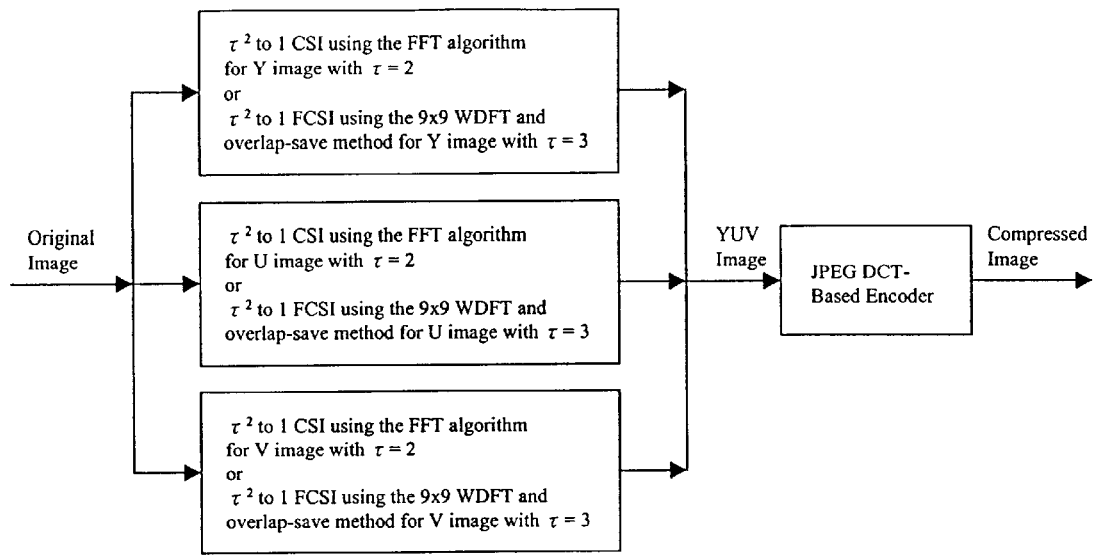
FIG. 15 is an exemplary modified JPEG encoder for τ=2, 3
Figure 16:
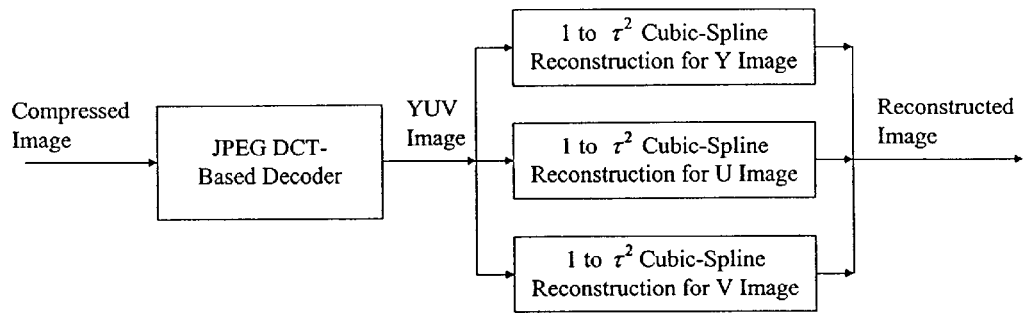
FIG. 16 is an exemplary modified JPEG decoder for τ=2, 3.

In this section, a modified JPEG encoder-decoder is presented for image data compression. This algorithm applies the CSI or. FCSI scheme with a compression ratio of $τ^2$ to 1 as the pre-processing step of the JPEG encoder for τ=2, 3 as shown in FIG. 15. As a consequence the cubic-spline reconstruction with a ratio of 1 to $τ^2$ is used for the post-processing step of this JPEG decoder for τ=2, 3 as shown in FIG. 16. For this compression algorithm, an original image in the RGB (Red, Green and Blue) color space is converted into another preliminary image in YUV color space prior to the CSI or FCSI pre-processing.

This YUV image is followed by the CCIR 601 color space with format 4:1:1. The size of the original RGB image is assumed to be 512×512×3=786,432 bytes, i.e., each set of 512×512=262,144 bytes is for one of the red, green, and blue colors. After color-space conversion one set of 512×512 bytes is used for Y, and two sets of 256×256=65,536 bytes are used for the U and V color components. It follows from Phillip E. Mattison, *Practical Digital Video with Programming Examples in C*, John Wiley & Sons, Inc., 1994 [19], the contents of which are hereby incorporated be reference, that the equations for the conversion from RGB to YUV are Y=0.2998+0.587G+0.114B, U=0.493(B−Y)=0.463B−0.1478−0.289G and V=0.877(R−Y)=0.615R−0.515G−0.100B.

There are two processing steps in the encoder phase. The first step is the pre-processing that uses the CSI or FCSI scheme with a compression ratio of $\tau^2$ to 1 for each of Y, U, and V images. In this procedure, the input image is a Y image of size 512×512 bytes, and the output image is an encoded image of size $\lceil 512/\tau \rceil \times \lceil 512/\tau \rceil$ bytes, where $\lceil x \rceil$ denotes the least integer greater than or equal to x. For the U and V images the input image has 256×256 bytes so that the output image to be encoded is $\lceil 256/\tau \rceil \times \lceil 256/\tau \rceil$ bytes. In other words, there are two cases used in this step. For the first case τ=2, the CSI scheme implemented directly with the FFt algorithm is used for the original Y, U and V images and the output images are 256×256 bytes for Y image and 128×128 bytes for U and V images.

For the second case τ=3, the FCSI scheme implemented by the 9×9 WDFT with overlap-save method is used for the original Y, U and V images and the output images are 171×171 bytes for Y image and 85×85 bytes for U and V images. At the end of the CSU or FCSI algorithm the three separate Y, U and V images are combined into one YUV image. The second step is to use the JPEG DCT-based encoding algorithm [9]. The image after this step is called the compressed image. This compressed image has now a very small number of pixels when compared to the original image. The resulting image still has the standard JPEG format. As a consequence, this compressed image can use the standard JPEG decoder, also save on storage and decrease the transfer time for a communication.

Also in the modified JPEG decoder, there are two processes used which are reversed in some of the encoding steps. The first step is the JPEG DCT-based decoding algorithm [9]. After this step, the image file is separated into three separate Y, U, and V images. The second step is the post-processing step that uses the cubic-spline reconstruction with a ratio of 1 to $\tau^2$ for Y, U, and V image. This step uses only the cubic-spline function to reconstruct the image data. After this interpolation the size of the Y image is therefore converted from $\lceil 512/\tau \rceil \times \lceil 512/\tau \rceil$, i.e., 256×256 for τ=2 or 171×171 for τ=3, to 512×512 bytes, and the U and V images are increased from $\lceil 256/\tau \rceil \times \lceil 256/\tau \rceil$, i.e., 128×128 for τ=2 or 85×85 for τ=3, to 256×256 bytes. Then the three Y, U, and V images are combined again into one YUV format. Finally, this YUV image is converted into the reconstructed RGB image. Again, it follows from [19] that the equations for the conversion from YUV to RGB are R=Y+1.140V, G=Y−0.395U−0.581V, and B=Y+2.032U.

VIII. EXPERIMENTAL RESULTS

Let X(i,j) and S(i,j) be the original and reconstructed images, respectively, where $0 \leq i \leq M-1$ and $0 \leq j \leq N-1$ are the index numbers separated in the vertical and horizontal directions of the images. The mean-square error (MSE) of the 2-D signal of an image is given by $$MSE = \frac{1}{M \times N} \sum_{i=0}^{M-1} \sum_{j=0}^{N-1} |X(i,j) - S(i,j)|^2. \quad (38)$$

Thus, the PSNR of the 2-D signal are defined by $$PSNR_X(\text{dB}) = 10\log_{10}\left(\frac{255^2}{MSE_X}\right), \text{ for } X \in \{Y, U, V\}, \quad (39)$$

where $MSE_y$, $MSE_u$ and $MSE_v$ are the MSE of color component Y, U and V, respectively. The total PSNR of the color component Y, U and V is defined by $$PSNR_T(\text{dB}) = 10\log_{10}\frac{255^2}{(MSE_Y + MSE_U + MSE_V)/3}. \quad (40)$$

Experimental results for the 2-D signal are presented using linear interpolation, linear spline interpolation, cubic-convolution interpolation, cubic B-spline interpolation and the CSI scheme. Using the encoding method described in Section II and the decoding method described in Section III for the 2-D signal with τ=2, from (38) and (39), the PSNR values of the 2-D signal with a compression ratio of 4:1 (τ=2) are calculated for some gray images of size 512 by 512. The experimental results of the 2-D signal using the above five interpolation schemes are shown in Table III. The results in this table show that the CSI scheme obtains the best PSNR over all other compared interpolation methods.

TABLE III

THE PSNR (dB) OF 2-D FUNCTION WITH COMPRESSION RATIO 4:1 (τ = 2).

| Image | Linear | Linear Spline (AOL) | Cubic Convolution | Cubic B-Spline | CSI |
|---|---|---|---|---|---|
| Peppers | 31.50 | 32.50 | 32.06 | 30.38 | 33.21 |
| Lake | 29.11 | 30.15 | 29.56 | 28.65 | 30.87 |
| Couple | 29.09 | 30.01 | 29.16 | 27.86 | 30.51 |
| Crowd | 32.10 | 32.74 | 32.93 | 31.63 | 33.86 |
| Lena | 33.48 | 34.13 | 34.02 | 32.11 | 35.08 |

In Table IV, the experimental results with a compression ratio of 9:1 (τ=3) are presented for the FCSI algorithm that uses zonal filter 1, zonal filter 2, zonal filter 3 and zonal filter 4 for the same gray images of size 512 by 512. It is observed from this table that the FCSI scheme with zonal filter 4 obtains a PSNR that is similar to the other three zonal filters. In addition, the experimental results with a compression ratio 9:1 (τ=3) that use linear interpolation, linear-spline interpolation, cubic-convolution interpolation and the FCSI scheme with zonal filter 4 are shown in Table V for the same gray images of size 512 by 512. It follows from this table that the FSCI scheme with zonal filter 4 obtains the best PSNR of the four interpolation methods.

TABLE IV

THE PSNR (dB) WITH COMPRESSION RATIO OF 9:1 ($\tau = 3$) FOR THE FCSI SCHEME WITH DIFFERENT ZONAL FILTERS.

| Image | Zonal Filter 1 | Zonal Filter 2 | Zonal Filter 3 | Zonal Filter 4 |
| --- | --- | --- | --- | --- |
| Peppers | 30.44 | 30.39 | 29.84 | 30.29 |
| Lake | 27.74 | 27.72 | 27.38 | 27.64 |
| Couple | 27.33 | 27.32 | 27.06 | 27.02 |
| Crowd | 29.87 | 29.68 | 29.46 | 29.54 |
| Lena | 31.54 | 31.50 | 30.83 | 31.43 |

TABLE V

THE PSNR (dB) WITH COMPRESSION RATIO OF 9:1 ($\tau = 3$) FOR FOUR INTERPOLATION SCHEMES.

| Image | Linear | Linear Spline (AOL) | Cubic Convolution | FCSI with Zonal Filter 4 |
| --- | --- | --- | --- | --- |
| Peppers | 28.65 | 29.80 | 29.14 | 30.59 |
| Lake | 26.00 | 27.11 | 26.28 | 27.64 |
| Couple | 25.75 | 26.83 | 25.60 | 27.02 |
| Crowd | 28.04 | 28.98 | 28.43 | 29.54 |
| Lena | 29.98 | 30.96 | 30.22 | 31.43 |

Table VI lists the PSNR values of the reconstructed color test (Lena) image of size 512 by 512 at different compression ratios for the JPEG method [13], the AOL algorithm [8], and the modified JPEG encoder-decoder for $\tau=2$ described in FIG. 15 and FIG. 16, also see [10]. For the same compression ratios the PSNR of the Lena image, obtained by the modified JPEG encoder-decoder for $\tau=2$ are higher than those of both the JPEG method and the AOL algorithm. Furthermore, using (40), Table VII lists the total PSNR values of the colored reconstructed Lena image of size 512 by 512 at higher compression ratios for the JPEG method, the AOL algorithm, and the modified JPEG encoder-decoder for $\tau=2$ and $\tau=3$. For the same compression ratio of 250:1 the total PSNR value of the Lena image, obtained by the modified JPEG encoder-decoder for $\tau=3$, is higer than the JPEG method, the AOP algorithm and the modified JPEG encoder-decoder for $\tau=2$.

TABLE VII

TOTAL PSNR (dB) VALUES OF THE RECONSTRUCTED COLOR LENA IMAGE OF SIZE 512 BY 512 AT DIFFERENT COMPRESSION RATIOS FOR JPEG, AOL, MODIFIED JPEG ENCODER-DECODER FOR $\tau = 2$ AND $\tau = 3$.

| Compression Ratio | JPEG [13] | AOL [8] | Modified JPEG for $\tau = 2$ [10] | Modified JPEG for $\tau = 3$ |
| --- | --- | --- | --- | --- |
| 250:1 | 26.32 | 30.25 | 30.40 | 30.53 |
| 200:1 | 27.90 | 31.06 | 31.18 | 31.19 |
| 150:1 | 30.13 | 32.14 | 32.20 | 31.95 |
| 100:1 | 32.59 | 33.46 | 33.66 | 33.11 |

For the gray Lena image of size 512 by 512, the computational times of the CSI and FCSI schemes for $\tau=3$ were implemented on a 400-MHz Intel Pentium II personal computer using C-code. In the encoder, the FCSI scheme using the 9-point WDFT with overlap-save sub-images requires around 0.15 sec when compared with around 0.57 sec for the CSI using the FFT. Therefore, the FCSI scheme is faster than that of the CSI scheme.

Finally, the JPEG method, the AOL algorithm, and the modified JPEG encoder-decoder for $\tau=2$ and $\tau=3$ were also implemented on the same 400-MHz Intel Pentium II personal computer using C-code. The computational time of the color Lena image of size 512 by 512 at the compression ratio of 200:1 for these four algorithms are given in Table VIII. In the encoding and decoding, the modified JPEG encoder-decoder for $\tau=3$ requires only 0.42 sec and 0.27 sec when compared with 1.13 sec and 0.34 sec for the modified JPEG encoder-decoder for $\tau=2$, 1.09 sec and 0.30 sec for the AOL algorithm, and 0.80 sec and 0.65 sec for the JPEG method, respectively. It is by this means the computational time of the modified JPEG encoder for $\tau=3$ requires, respectively, 0.71 sec, 0.67 sec, and 0.38 sec less time than the modified JPEG encoder for $\tau=2$, the AOL encoder, and the JPEG encoder. Also, the computational time of the modified JPEG decoder for $\tau=3$ requires, respectively, 0.07 sec, 0.03 sec, and 0.38 sec less time than the modified JPEG decoder for $\tau=2$, the AOL decoder, and the JPEG decoder.

TABLE VI

PSNR (dB) VALUES OF THE RECONSTRUCTED COLOR LENA IMAGE OF SIZE 512 BY 512 AT DIFFERENT COMPRESSION RATIOS FOR JPEG, AOL, AND MODIFIED JPEG ENCODER-DECODER FOR $\tau = 2$.

| Compression Ratio | JPEG [13] | | | AOL [8] | | | Modified JPEG for $\tau = 2$ | | |
| --- | --- | --- | --- | --- | --- | --- | --- | --- | --- |
| | Y | U | V | Y | U | V | Y | U | V |
| 125:1 | 29.48 | 32.67 | 32.59 | 30.11 | 34.80 | 35.00 | 30.27 | 34.89 | 35.00 |
| 100:1 | 30.76 | 33.90 | 33.90 | 30.91 | 35.60 | 35.75 | 31.20 | 35.66 | 35.85 |
| 75:1 | 32.15 | 35.37 | 35.31 | 31.80 | 36.38 | 36.41 | 32.15 | 36.45 | 36.42 |
| 50:1 | 34.00 | 37.08 | 37.05 | 32.86 | 37.41 | 37.31 | 33.36 | 37.42 | 37.32 |

TABLE VIII

THE COMPUTATIONAL TIME (sec) OF THE COLOR LENA IMAGE OF SIZE 512 BY 512 AT THE COMPRESSION RATIO OF 200:1 IMPLEMENTED ON A 400-MHz INTEL PENTIUM II PERSONAL COMPUTER.

|  | Encoder | Decoder |
| --- | --- | --- |
| Modified JPEG for τ = 3 | 0.42 | 0.27 |
| Modified JPEG for τ = 2 [10] | 1.13 | 0.34 |
| AOL algorithm [8] | 1.09 | 0.30 |
| JPEG method [13] | 0.80 | 0.65 |

Figure 17:
FIGS. 17(a)–(d) illustrate some reconstructed images with a compression ratio of 100:1.
Figure 17:
Figure 17:
Figure 17:
Figure 18:
FIGS. 18(a)–(d) illustrate some reconstructed images with a compression ratio of 200:1.
Figure 18:
Figure 18:
Figure 18:

FIG. 17 shows the reconstructed image of Lena at the same compression ratio of 100:1, using the JPEG method, the AOL algorithm, and the modified JPEG encoder-decoder for τ=2. Clearly the Lena image using the modified JPEG encoder-decoder for τ=2 indicates a better subjective quality of reconstructed image than both the JPEG method and the AOL algorithm. Also FIG. 18 shows the reconstructed image of Lena at a higher compression ratio of 200:1, using the JPEG method, the AOL algorithm, and the modified JPEG encoder-decoder for τ=2 and τ=3. In this figure, the Lena image using the modified JPEG encoder-decoder for τ=3 indicates a better subjective quality of reconstructed images than the JPEG algorithm, the AOL algorithm and the modified JPEG encoder-decoder for τ=2.

FIG. 17($a$) shows an original Lena image, while FIG. 17($b$) depicts a reconstructed image by the JPEG method with $PSNR_Y$=30.76 dB, $PSNR_U$=33.90 dB, and $PSNR_V$=33.90 dB. FIG. 17($c$) illustrates a reconstructed image by the AOL algorithm with $PSNR_Y$=30.91 dB, $PSNR_U$=35.60 dB, and $PSNR_V$=35.75 dB; and FIG. 17($d$) represents a reconstructed image by the modified JPEG encoder-decoder for τ=2, $PSNR_Y$=31.20 dB, $PSNR_U$=35.66 dB, $PSNR_V$=35.85 dB.

FIG. 18($a$) shows a reconstructed image by the JPEG algorithm with encoding time=0.80 sec, decoding time=0.65 sec, and $PSNR_T$=27.90 dB, while FIG. 18($b$) depicts a reconstructed image by the AOL algorithm with encoding time=1.09 sec, decoding time=0.30 sec, and $PSNR_T$=31.06 dB. FIG. 18($c$) illustrates a reconstructed image by the modified JPEG encoder-decoder for τ=2, encoding time=1.13 sec, decoding time=0.34 sec, and $PSNR_T$=31.18 dB; and FIG. 18($d$) represents a reconstructed image by the modified JPEG encoder-decoder for τ=3, Encoding time=0.42 sec, Decoding time=0.27 sec, $PSNR_T$=31.19 dB.

9-POINT WINOGRAD DISCRETE FOURIER TRANSFORM

The algorithm developed in Dean P. Kolba and Thomas W. Parks, "A prime factor FFT algorithm using high-speed convolution," *IEEE Trans. on Acoustic, Speech, and Signal Processing*, vol. ASSP-25, No.4, pp.281–294, August 1997 [16], the contents of which are hereby incorporated by reference, for computing the 9-point Winograd discrete Fourier tranform (DFT) is shown by $$X(k) = \sum_{n=0}^{8} x(n)W^{nk}, \quad k = 0, \ldots, 8, \tag{41}$$

where $W=e^{-j(2\pi/9)}$ is the 9-th root of unity in the complex number field, and $j=\sqrt{-1}$.

Algorithm for the 9-point Winograd DFT:
$a_1=x(1)+x(8)$, $a_2=x(1)-x(8)$, $a_3=x(2)+x(7)$, $a_4=x(2)-x(7)$, $a_5=x(4)+x(5)$, $a_6=x(4)-x(5)$, $a_7=x(3)+x(6)$, $a_8=x(3)-x(6)$, $a_9=-a_1+a_5$, $a_{10}=a_1-a_3$, $a_{11}=-a_3+a_5$, $a_{12}=a_2-a_6$, $a_{13}=a_2+a_4$, $a_{14}=-a_4-a_6$, $a_{15}=a_1+a_3+_5$, $a_{16}=a_2-a_4+a_6$, $a_{17}=x(0)+a_{15}+a_7$, $m_1=0.19740a_9$, $m_2=0.56858a_{10}$, $m_3=0.37111a_{11}$, $m_4=0.54253a_{12}$, $m_5=0.10026a_{13}$, $m_6=0.44228a_{14}$, $m_7=\frac{1}{2}a_7$, $m_8=0.86603a_8$, $m_9=\frac{1}{2}a_{15}$, $m_{10}=0.86603a_{16}$, $c_1=x(0)-m_7$, $c_2=m_2-m_3$, $c_3=m_1+m_3$, $C_4=m_1+m_2$, $c_5=c_1+c_2-c_3$, $c_6=c_1+c_3+c_4$, $c_7=c_1-c_2-c_4$, $c_8=m_4-m_6$, $c_9=m_5-m_6$, $c_{10}=m_4-m_5$, $c_{11}=c_8+c_9+m_8$, $c_{12}=c_8+c_{10}-m_8$, $c_{13}=-c_9+c_{10}+m_8$, $c_{14}=x(0)+a_7-m_9$, $X(0)=a_{17}$, $X(1)=c_5-jc_{11}$, $X(2)=c_6-jc_{12}$, $X(3)=c_{14}-jm_{10}$, $X(4)=c_7-jc_{13}$, $X(5)=c_7+jc_{13}$, $X(6)=c_{14}+jm_{10}$, $X(7)=c_6+jc_{12}$, $X(8)=c_5+jc_{11}$, Thus, the 9-point Winograd DFT requires only 8 multiplications, 49 additions, and 2 shifts, a substantially smaller number of computations than other known algorithms.

THE 5-POINT WINOGRAD DISCRETE FOURIER TRANSFORM

The alrogithm developed in [16] for computing the 5-point Winograd discrete Fourier transform (DFT) is given by:

$$X(k) = \sum_{n=0}^{4} x(n)W^{nk}, \quad k = 0, \ldots, 4, \tag{42}$$

where $W=e^{-j(2\pi/5)}$ is the 5-th root of unity in the complex number field, and $j=\sqrt{-1}$.

Algorithm for the 5-point Winograd DFT is given by:
$a_1=x(1)+x(4)$, $a_2=x(1)-x(4)$, $a_3=x(2)+x(3)$, $a_4=x(2)-x(3)$, $a_5=a_2+a_4$, $a_6=a_1-a_3$, $a_7=a_1+a_3$, $a_8=x(0)+a_7$, $m_1=0.95106a_5$, $m_2=1.53884a_2$, $m_3=0.36327a_4$, $m_4=0.55902a_6$, $m_4=\frac{1}{4}a_7$, $c_1=x(0)-m_5$, $c_2=c_1+m_4$, $c_3=c_1-m_4$, $c_4=m_1-m_3$, $c_5=m_2-m_1$, $X(0)=a_8$, $X(1)=c_2-jc_4$, $X(2)=c_3-jc_5$, $X(3)=c_3+jc_5$, $X(4)=c_2+jc_4$.

Thus, the 5-point Winograd DFT requires only 4 multiplications, 17 additions, and 1 shift, a substantially smaller number of computations than other known algorithms.

In this invention, a new CSI scheme based on the least-squares method with the cubic-spline function has been proposed to compress the image data. It is shown that the CSI scheme implemented by the FFT algorithm yields a better PSNR performance than all other interpolation methods for the reconstructed image. In addition a fast CSI, called FCSI, is developed for image compression. Such a FCSI scheme requires fewer additions and multiplications in the decimation process than the original CSI scheme. In the FCSI, a fast 9-point WDFT algorithm is used to compute the CSI scheme with zonal filter 4 and an overlap-save sub-image technique is utilized to solve the serious boundary artifacts between any two neighboring sub-images of the actual image. It is shown by computer runs that the FCSI scheme requires 0.42 sec less time than the original CSI scheme for τ=3.

Finally, this FCSI scheme for τ=3 is used with the JPEG encoder-decoder to speed up the modified JPEG encoder-decoder for τ=2 in color image coding. A computer simulation shows that the modified JPEG encoder-decoder for τ=3 obtains a better subjective quality and PSNR of the reconstructed image than the JPEG method for high compression ratios. Also, it requires less computational time than the JPEG method, the AOL algorithm and the modified JPEG encoder-decoder for τ=2 in both the encoding and decoding processes.

It is understood that the exemplary schemes and the respective implementations described herein and shown in the drawings represents only exemplary embodiments of the present invention. Indeed, various modifications and additions may be made to such embodiment without departing from the spirit and scope of the invention. For example, the present invention can be implemented utilizing a computer program, a dedicated electronic circuit, or firmware for an electronic image processing chip.

Furthermore, those skilled in the art will appreciate that the method of the present invention is applicable to images having various different sizes with different values for τ and different sizes for Winograd DFT. Thus, the description herein of a 9×9, or 5×5 of Winograd DFT is by way of illustration only, and not by way of limitation. Further, those skilled in the art will appreciate that various different VLSI implementations of the present invention are contemplated. Thus, these and other modifications and additions may be obvious to those skilled in the art and may be implemented to adapt the present invention for use in a variety of different applications including streaming of video signals, combining with MPEG IV standard for still pictures, applying to JPEG 2000 standard, reducing the size of digital pictures (such as in digital cameras), and the like.

What is claimed is:

1. A method performed by a computer for coding a signal comprising the steps of:
    defining a cubic-spline filter;
    correlating the filter with the signal to obtain a correlated signal;
    autocorrelating the filter to obtain autocorrelated filter coefficients;
    computing a transform of the correlated signal and the autocorrelated filter coefficients;
    dividing the transform of the correlated signal by the transform of the autocorrelated filter coefficient to obtain a transform of a compressed signal; and
    computing an inverse transform of the transform of the compressed signal to obtain the compressed signal.

2. The method of claim 1, wherein the signal, the filter, and the transforms are one dimensional.

3. The method of claim 1, wherein the signal, the filter, and the transforms are two dimensional.

4. The method of claim 1, further comprising the step of computing a convolution of the compressed signal and the filter to obtain a reconstructed signal.

5. The method of claim 1, wherein the step of computing a transform comprises computing a fast Fourier transform (FFT) and the step of computing an inverse transform comprises computing an inverse FFT.

6. The method of claim 1, wherein the step of computing a transform comprises computing a Winograd discrete Fourier transform (WDFT) with an overlap-save scheme and the step of computing an inverse transform comprises computing an inverse WDFT.

7. The method of claim 1, further comprising the step of defining a zonal filter to simplify the steps of correlating and autocorrelating.

8. A modified JPEG encoder for data compression comprising:
    a cubic-spline filter;
    means for correlating the filter with an input signal to obtain a correlated signal;
    means for autocorrelating the filter to obtain autocorrelated filter coefficients;
    means for computing a transform of the correlated signal and the autocorrelated filter coefficients;
    means for dividing the transform of the correlated signal by the transform of the autocorrelated filter coefficients to obtain a transform of a compressed signal; and
    means for computing an inverse transform of the transform of the compressed signal to obtain the compressed signal.

9. The encoder of claim 8, wherein the signal, the filter, and the transforms are one dimensional.

10. The encoder of claim 8, wherein the signal, the filter, and the transforms are two dimensional.

11. The encoder of claim 8, further comprising a decoder having means for computing a convolution of the compressed signal and the filter to obtain a reconstructed signal.

12. The encoder of claim 8, wherein the means for computing a transform comprises means for computing a fast Fourier transform (FFT) and the means for computing an inverse transform comprises means for computing an inverse FFT.

13. The encoder of claim 8, wherein the means for computing a transform comprises means for computing a Winograd discrete Fourier transform (WDFT) with an overlap-save scheme and the means for computing an inverse transform comprises means for computing an inverse WDFT.

14. The encoder of claim 8, further comprising means for defining a zonal filter to simplify the means for correlating and the means for autocorrelating.

15. A method performed by a computer for coding a 1-D signal comprising the steps of:
    defining a 1-D cubic-spline filter by $$R(t) = \begin{cases} (3/2)|t|^3 - (5/2)|t|^2 + 1, & 0 \le |t| < 1 \\ -(1/2)|t|^3 + (5/2)|t|^2 - 4|t| + 2, & 1 \le |t| < 2 \\ 0, & 2 \le |t| \end{cases} \quad (1)$$

applying the filter to an input signal Xm with $$Y_j = \sum_{m=-2\tau+1}^{2\tau-1} X(m+j\tau)R(m) \quad (9)$$

applying $$A_{j,k} = \sum_{m=-2\tau+1}^{2\tau-1} R(m+(j-k)\tau)R(m) \quad (10)$$

$$= \begin{cases} \sum_{m=-2\tau+1}^{2\tau-1} (R(m))^2 = \alpha & \text{if } j-k \equiv 0 \bmod n \\ \sum_{m=-2\tau+1}^{2\tau-1} R(m+\tau)R(m) = \beta & \text{if } j-k \equiv \pm 1 \bmod n \\ \sum_{m=-2\tau+1}^{2\tau-1} R(m+2\tau)R(m) = \gamma & \text{if } j-k \equiv \pm 2 \bmod n \\ \sum_{m=-2\tau+1}^{2\tau-1} R(m+3\tau)R(m) = \delta & \text{if } j-k \equiv \pm 3 \bmod n \\ 0 & \text{otherwise} \end{cases}$$

where $A_{j,k}$ can be expressed in circulant form by letting $$A_{j,k} = B_{(k-j)n} \qquad (11)$$

and where $(k-j)_n$ denotes the residue $(k-j)$ modulo $n$, and $$B_0=\alpha,\ B_1=\beta,\ B_2=\gamma,\ B_3=\delta,\ B_4=0,\ \ldots,\ B_{n-4}=0,\ B_{n-3}=\delta,\ B_{n-2}=\gamma, \qquad (12)$$

$B_{n-1}=\beta$, to compute $B_j$;

computing the FFT of $Y_j$ and $B_j$ to obtain $\tilde{Y}_m$ and $\tilde{B}_m$, respectively;

computing $\tilde{X}_m = \tilde{Y}_m / \tilde{B}_m$; and computing the inverse FFT of $\tilde{X}_m$ to obtain a compressed data $X_k$.

16. The method of claim 15 further comprising the step of:

applying $X_k$ in $$\sum_{k=0}^{n-1} A_{j,k} X_k = Y_j \text{ for } 0 \le j \le n-1, \qquad (5)$$

to perform a convolution of $X_k$ and $R(t)$ given by $$R(t) = \begin{cases} (3/2)|t|^3 - (5/2)|t|^2 + 1, & 0 \le |t| < 1 \\ -(1/2)|t|^3 + (5/2)|t|^2 - 4|t| + 2, & 1 \le |t| < 2 \\ 0, & 2 \le |t| \end{cases} \qquad (1)$$

to obtain $S(t)$ given by $$S(t) = \sum_{k=0}^{n-1} X_k \Psi_k(t) = \sum_{k=0}^{n-1} X_k R(t-k\tau). \qquad (3)$$

17. The method of claim 1, wherein $\tau=16$.

18. The method of claim 1, wherein $\tau=17$.

19. An encoder for data compression comprising:

a 1-D cubic-spline filter defined by $$R(t) = \begin{cases} (3/2)|t|^3 - (5/2)|t|^2 + 1, & 0 \le |t| < 1 \\ -(1/2)|t|^3 + (5/2)|t|^2 - 4|t| + 2, & 1 \le |t| < 2 \\ 0, & 2 \le |t| \end{cases} \qquad (1)$$

means for applying the filter to an input signal $X_m$ with $$Y_j = \sum_{m=-2\tau+1}^{2\tau-1} X(m+j\tau)R(m) \qquad (9)$$

to compute $Y_j$; means for applying $$A_{j,k} = \sum_{m=-2\tau+1}^{2\tau-1} R(m+(j-k)\tau)R(m) \qquad (10)$$

$$= \begin{cases} \sum_{m=-2\tau+1}^{2\tau-1} (R(m))^2 = \alpha & \text{if } j-k \equiv 0 \bmod n \\ \sum_{m=-2\tau+1}^{2\tau-1} R(m+\tau)R(m) = \beta & \text{if } j-k \equiv \pm 1 \bmod n \\ \sum_{m=-2\tau+1}^{2\tau-1} R(m+2\tau)R(m) = \gamma & \text{if } j-k \equiv \pm 2 \bmod n \\ \sum_{m=-2\tau+1}^{2\tau-1} R(m+3\tau)R(m) = \delta & \text{if } j-k \equiv \pm 3 \bmod n \\ 0 & \text{otherwise} \end{cases}$$

where $A_{j,k}$ can be expressed in circulant form by letting $$A_{j,k} = B_{(k-j)n} \qquad (11)$$

and where $(k-j)_n$ denotes the residue $(k-j)$ modulo $n$, and $$B_0=\alpha,\ B_1=\beta,\ B_2=\gamma,\ B_3=\delta,\ B_4=0,\ \ldots,\ B_{n-4}=0,\ B_{n-3}=\delta,\ B_{n-2}=\gamma, \qquad (12)$$

$B_{n-1}=\beta$, to compute $B_j$;

means for computing the FFT of $Y_j$ and $B_j$ to obtain $\tilde{Y}_m$ and $\tilde{B}_m$, respectively;

means for computing $\tilde{X}_m = \tilde{Y}_m / \tilde{B}_m$; and means for computing the inverse FFT of $\tilde{X}_m$ to obtain a compressed data $X_k$.

20. The encoder of claim 19, further comprising a decoder having means for applying $X_k$ in $$\sum_{k=0}^{n-1} A_{j,k} X_k = Y_j \text{ for } 0 \le j \le n-1, \qquad (5)$$

to perform a convolution of $X_k$ and $R(t)$ given by $$R(t) = \begin{cases} (3/2)|t|^3 - (5/2)|t|^2 + 1, & 0 \le |t| < 1 \\ -(1/2)|t|^3 + (5/2)|t|^2 - 4|t| + 2, & 1 \le |t| < 2 \\ 0, & 2 \le |t| \end{cases} \quad (1)$$

to obtain $S(t)$ given by $$S(t) = \sum_{k=0}^{n-1} X_k \Psi_k(t) = \sum_{k=0}^{n-1} X_k R(t - k\tau). \quad (3)$$

21. The encoder of claim 19, wherein $\tau=2$.

22. The encoder of claim 19, wherein $\tau=3$.

23. A method performed by a computer for coding a 2-D signal comprising the steps of:

defining a 2-D cubic-spline filter by $R(t_1,t_2)=R(t_1)\cdot R(t_2)$, (17)

where $R(t_1)$ and $R(t_2)$ are 1-D cubic-spline functions, respectively;

applying the filter to an input signal $X(t_1, t_2)$ with periods $n_1\tau$ and $n_2\tau$, with $$Y_{j_1,j_2} = \sum_{m_1=-2\tau+1}^{2\tau-1} \sum_{m_2=-2\tau+1}^{2\tau-1} X(m_1 + j_1\tau, m_2 + j_2\tau)R(m_1, m_2), \quad (25)$$

to compute $Y_{j_1,j_2}$;

$$A_{j_1 j_2, k_1 k_2} = \sum_{m_1=-2\tau+1}^{2\tau-1} \sum_{m_2=-2\tau+1}^{2\tau-1} R(m_1 + (j_1-k_1)\tau, m_2 + (j_2-k_2)\tau)R(m_1, m_2)$$

$$= \begin{cases} \sum_{m_1,m_2=-2\tau+1}^{2\tau-1} (R(m_1, m_2))^2 = \alpha & \text{if } j_1 - k_1 \equiv 0 \bmod n_1 \text{ and } j_2 - k_2 \equiv 0 \bmod n_2 \\[6pt] \sum_{m_1,m_2=-2\tau+1}^{2\tau-1} R(m_1 \pm \tau, m_2)R(m_1, m_2) = \beta & \text{if } j_1 - k_1 \equiv \pm 1 \bmod n_1 \text{ and } j_2 - k_2 \equiv 0 \bmod n_2 \\ & \text{or } j_1 - k_1 \equiv 0 \bmod n_1 \text{ and } j_2 - k_2 \equiv \pm 1 \bmod n_2 \\[6pt] \sum_{m_1,m_2=-2\tau+1}^{2\tau-1} R(m_1 \pm 2\tau, m_2)R(m_1, m_2) = \gamma & \text{if } j_1 - k_1 \equiv \pm 2 \bmod n_1 \text{ and } j_2 - k_2 \equiv 0 \bmod n_2 \\ & \text{or } j_1 - k_1 \equiv 0 \bmod n_1 \text{ and } j_2 - k_2 \equiv \pm 2 \bmod n_2 \\[6pt] \sum_{m_1,m_2=-2\tau+1}^{2\tau-1} R(m_1 \pm 3\tau, m_2)R(m_1, m_2) = \delta & \text{if } j_1 - k_1 \equiv \pm 3 \bmod n_1 \text{ and } j_2 - k_2 \equiv 0 \bmod n_2 \\ & \text{or } j_1 - k_1 \equiv 0 \bmod n_1 \text{ and } j_2 - k_2 \equiv \pm 3 \bmod n_2 \\[6pt] \sum_{m_1,m_2=-2\tau+1}^{2\tau-1} R(m_1 \pm \tau, m_2 \pm \tau)R(m_1, m_2) = \eta & \text{if } j_1 - k_1 \equiv \pm 1 \bmod n_1 \text{ and } j_2 - k_2 \equiv \pm 1 \bmod n_2 \\[6pt] \sum_{m_1,m_2=-2\tau+1}^{2\tau-1} R(m_1 \pm 2\tau, m_2 \pm \tau)R(m_1, m_2) = \lambda & \text{if } j_1 - k_1 \equiv \pm 2 \bmod n_1 \text{ and } j_2 - k_2 \equiv \pm 1 \bmod n_2 \\ & \text{or } j_1 - k_1 \equiv \pm 1 \bmod n_1 \text{ and } j_2 - k_2 \equiv \pm 2 \bmod n_2 \\[6pt] \sum_{m_1,m_2=-2\tau+1}^{2\tau-1} R(m_1 \pm 3\tau, m_2 \pm \tau)R(m_1, m_2) = \mu & \text{if } j_1 - k_1 \equiv \pm 3 \bmod n_1 \text{ and } j_2 - k_2 \equiv \pm 1 \bmod n_2 \\ & \text{or } j_1 - k_1 \equiv \pm 1 \bmod n_1 \text{ and } j_2 - k_2 \equiv \pm 3 \bmod n_2 \\[6pt] \sum_{m_1,m_2=-2\tau+1}^{2\tau-1} R(m_1 \pm 2\tau, m_2 \pm 2\tau)R(m_1, m_2) = \rho & \text{if } j_1 - k_1 \equiv \pm 2 \bmod n_1 \text{ and } j_2 - k_2 \equiv \pm 2 \bmod n_2 \\[6pt] \sum_{m_1,m_2=-2\tau+1}^{2\tau-1} R(m_1 \pm 3\tau, m_2 \pm 2\tau)R(m_1, m_2) = \sigma & \text{if } j_1 - k_1 \equiv \pm 3 \bmod n_1 \text{ and } j_2 - k_2 \equiv \pm 2 \bmod n_2 \\ & \text{or } j_1 - k_1 \equiv \pm 2 \bmod n_1 \text{ and } j_2 - k_2 \equiv \pm 3 \bmod n_2 \\[6pt] 0 & \text{otherwise} \end{cases}$$

where, the array $A_{j_1 j_2, k_1 k_2}$ can be expressed in 2-D circulant form as $$A_{j_1 j_2, k_1 k_2} = B_{(k_1-j_1)_{n_1}(k_2-j_2)_{n_2}} \qquad , (27)$$

where $(k_i-j_i)_{n_i}$ denotes the residue $(k_i-j_i)$ modulo $n_i$ for i=1,2 and $$[B_{s_1,s_2}] = \begin{pmatrix} B_{0,0} & B_{0,1} & B_{0,2} & B_{0,3} & 0 & \ldots & 0 & B_{0,n_2-3} & B_{0,n_2-2} & B_{0,n_2-1} \\ B_{1,0} & B_{1,1} & B_{1,2} & B_{1,3} & 0 & \ldots & 0 & B_{1,n_2-3} & B_{1,n_2-2} & B_{1,n_2-1} \\ B_{2,0} & B_{2,1} & B_{2,2} & B_{2,3} & 0 & \ldots & 0 & B_{2,n_2-3} & B_{2,n_2-2} & B_{2,n_2-1} \\ B_{3,0} & B_{3,1} & B_{3,2} & 0 & 0 & \ldots & 0 & 0 & B_{3,n_2-2} & B_{3,n_2-1} \\ 0 & 0 & 0 & 0 & 0 & \ldots & 0 & 0 & 0 & 0 \\ \vdots & \vdots & \vdots & \vdots & \vdots & \ddots & \vdots & \vdots & \vdots & \vdots \\ 0 & 0 & 0 & 0 & 0 & \ldots & 0 & 0 & 0 & 0 \\ B_{n_1-3,0} & B_{n_1-3,1} & B_{n_1-3,2} & 0 & 0 & \ldots & 0 & 0 & B_{n_1-3,n_2-2} & B_{n_1-3,n_2-1} \\ B_{n_1-2,0} & B_{n_1-2,1} & B_{n_1-2,2} & B_{n_1-2,3} & 0 & \ldots & 0 & B_{n_1-2,n_2-3} & B_{n_1-2,n_2-2} & B_{n_1-2,n_2-1} \\ B_{n_1-1,0} & B_{n_1-1,1} & B_{n_1-1,2} & B_{n_1-1,3} & 0 & \ldots & 0 & B_{n_1-1,n_2-3} & B_{n_1-1,n_2-2} & B_{n_1-1,n_2-1} \end{pmatrix} \quad (28)$$

$$= \begin{pmatrix} \alpha & \beta & \gamma & \delta & 0 & \ldots & 0 & \delta & \gamma & \beta \\ \beta & \eta & \lambda & \mu & 0 & \ldots & 0 & \mu & \lambda & \eta \\ \gamma & \lambda & \rho & \sigma & 0 & \ldots & 0 & \sigma & \rho & \lambda \\ \delta & \mu & \sigma & 0 & 0 & \ldots & 0 & 0 & \sigma & \mu \\ 0 & 0 & 0 & 0 & 0 & \ldots & 0 & 0 & 0 & 0 \\ \vdots & \vdots & \vdots & \vdots & \vdots & \ddots & \vdots & \vdots & \vdots & \vdots \\ 0 & 0 & 0 & 0 & 0 & \ldots & 0 & 0 & 0 & 0 \\ \delta & \mu & \sigma & 0 & 0 & \ldots & 0 & 0 & \sigma & \mu \\ \gamma & \lambda & \rho & \sigma & 0 & \ldots & 0 & \sigma & \rho & \lambda \\ \beta & \eta & \lambda & \mu & 0 & \ldots & 0 & \mu & \lambda & \eta \end{pmatrix},$$

where $0 \leq s_i \leq n_i - 1$ for i=1,2, to compute $B_{s_1,s_2}$;

computing the 2-D FFT of $Y_{j_1,j_2}$ and $B_{s_1,s_2}$ to obtain $\tilde{Y}_{m,n}$ and $\tilde{B}_{m,n}$, respectively;

computing $\tilde{X}_{m,n} = \tilde{Y}_{m,n}/\tilde{B}_{m,n}$; and computing the inverse FFT of $\tilde{X}_{m,n}$ to obtain a compressed image $X_{k_1,k_2}$.

24. The method of claim 23 further comprising the step of:

Applying $X_{k_1,k_2}$ in $$\sum_{k_1=0}^{n_1-1} \sum_{k_2=0}^{n_2-1} X_{k_1,k_2} A_{j_1 j_2,k_1 k_2} = Y_{j_1,j_2}, \qquad (21)$$

$$0 \leq j_i \leq n_i - 1 \text{ and } i = 1, 2.$$

to perform a 2-D convolution of $X_{k_1,k_2}$ and $R(t_1,t_2)=R(t_1)\cdot R(t_2)$ to obtain a 2-D reconstructed image $S(t_1,t_2)$.

25. The method of claim 23, wherein $\sigma=0$.

26. The method of claim 23, wherein $\sigma=\mu=0$.

27. The method of claim 23, wherein $\eta=\lambda=\rho=\mu=\sigma=0$.

28. The method of claim 23, wherein $\tau=2$.

29. The method of claim 23, wherein $\tau=3$.

30. An encoder for data compression comprising:

a 2-D cubic-spline filter defined by $R(t_1,t_2)=R(t_1)\cdot R(t_2)$, (17)

where $R(t_1)$ and $R(t_2)$ are 1-D cubic-spline functions, respectively;

means for applying the filter to an input signal $x(t_1,t_2)$ with periods $n_1\tau$ and $n_2\tau$, with $$Y_{j_1,j_2} = \sum_{m_1=-2\tau+1}^{2\tau-1} \sum_{m_2=-2\tau+1}^{2\tau-1} X(m_1 + j_1\tau, m_2 + j_2\tau) R(m_1, m_2), \qquad (25)$$

to obtain $Y_{j_1,j_2}$;

means for applying $$A_{j_1 j_2, k_1 k_2} = \sum_{m_1=-2\tau+1}^{2\tau-1} \sum_{m_2=-2\tau+1}^{2\tau-1} R(m_1 + (j_1 - k_1)\tau, m_2 + (j_2 - k_2)\tau) R(m_1, m_2)$$

$$= \begin{cases} \sum_{m_1, m_2 = -2\tau+1}^{2\tau-1} (R(m_1, m_2))^2 = \alpha & \text{if } j_1 - k_1 \equiv 0 \bmod n_1 \text{ and } j_2 - k_2 \equiv 0 \bmod n_2 \\[6pt]
\sum_{m_1, m_2 = -2\tau+1}^{2\tau-1} R(m_1 \pm \tau, m_2) R(m_1, m_2) = \beta & \text{if } j_1 - k_1 \equiv \pm 1 \bmod n_1 \text{ and } j_2 - k_2 \equiv 0 \bmod n_2 \\
 & \text{or } j_1 - k_1 \equiv 0 \bmod n_1 \text{ and } j_2 - k_2 \equiv \pm 1 \bmod n_2 \\[6pt]
\sum_{m_1, m_2 = -2\tau+1}^{2\tau-1} R(m_1 \pm 2\tau, m_2) R(m_1, m_2) = \gamma & \text{if } j_1 - k_1 \equiv \pm 2 \bmod n_1 \text{ and } j_2 - k_2 \equiv 0 \bmod n_2 \\
 & \text{or } j_1 - k_1 \equiv 0 \bmod n_1 \text{ and } j_2 - k_2 \equiv \pm 2 \bmod n_2 \\[6pt]
\sum_{m_1, m_2 = -2\tau+1}^{2\tau-1} R(m_1 \pm 3\tau, m_2) R(m_1, m_2) = \delta & \text{if } j_1 - k_1 \equiv \pm 3 \bmod n_1 \text{ and } j_2 - k_2 \equiv 0 \bmod n_2 \\
 & \text{or } j_1 - k_1 \equiv 0 \bmod n_1 \text{ and } j_2 - k_2 \equiv \pm 3 \bmod n_2 \\[6pt]
\sum_{m_1, m_2 = -2\tau+1}^{2\tau-1} R(m_1 \pm \tau, m_2 \pm \tau) R(m_1, m_2) = \eta & \text{if } j_1 - k_1 \equiv \pm 1 \bmod n_1 \text{ and } j_2 - k_2 \equiv \pm 1 \bmod n_2 \\[6pt]
\sum_{m_1, m_2 = -2\tau+1}^{2\tau-1} R(m_1 \pm 2\tau, m_2 \pm \tau) R(m_1, m_2) = \lambda & \text{if } j_1 - k_1 \equiv \pm 2 \bmod n_1 \text{ and } j_2 - k_2 \equiv \pm 1 \bmod n_2 \\
 & \text{or } j_1 - k_1 \equiv \pm 1 \bmod n_1 \text{ and } j_2 - k_2 \equiv \pm 2 \bmod n_2 \\[6pt]
\sum_{m_1, m_2 = -2\tau+1}^{2\tau-1} R(m_1 \pm 3\tau, m_2 \pm \tau) R(m_1, m_2) = \mu & \text{if } j_1 - k_1 \equiv \pm 3 \bmod n_1 \text{ and } j_2 - k_2 \equiv \pm 1 \bmod n_2 \\
 & \text{or } j_1 - k_1 \equiv \pm 1 \bmod n_1 \text{ and } j_2 - k_2 \equiv \pm 3 \bmod n_2 \\[6pt]
\sum_{m_1, m_2 = -2\tau+1}^{2\tau-1} R(m_1 \pm 2\tau, m_2 \pm 2\tau) R(m_1, m_2) = \rho & \text{if } j_1 - k_1 \equiv \pm 2 \bmod n_1 \text{ and } j_2 - k_2 \equiv \pm 2 \bmod n_2 \\[6pt]
\sum_{m_1, m_2 = -2\tau+1}^{2\tau-1} R(m_1 \pm 3\tau, m_2 \pm 2\tau) R(m_1, m_2) = \sigma & \text{if } j_1 - k_1 \equiv \pm 3 \bmod n_1 \text{ and } j_2 - k_2 \equiv \pm 2 \bmod n_2 \\
 & \text{or } j_1 - k_1 \equiv \pm 2 \bmod n_1 \text{ and } j_2 - k_2 \equiv \pm 3 \bmod n_2 \\[6pt]
0 & \text{otherwise}
\end{cases}$$

where, the array $A_{j_1 j_2, k_1 k_2}$ can be expressed in 2-D circulant form as $$A_{j_1 j_2, k_1 k_2} = B_{(k_1 - j_1)_{n_1} (k_2 - j_2)_{n_2}}, \qquad (27)$$

and where $(k_i - j_i)_{n_i}$ denotes the residue $(k_i - j_i)$ modulo $n_i$ for $i = 1, 2$ and $$[B_{s_1, s_2}] = \begin{pmatrix}
B_{0,0} & B_{0,1} & B_{0,2} & B_{0,3} & 0 & \cdots & 0 & B_{0, n_2-3} & B_{0, n_2-2} & B_{0, n_2-1} \\
B_{1,0} & B_{1,1} & B_{1,2} & B_{1,3} & 0 & \cdots & 0 & B_{1, n_2-3} & B_{1, n_2-2} & B_{1, n_2-1} \\
B_{2,0} & B_{2,1} & B_{2,2} & B_{2,3} & 0 & \cdots & 0 & B_{2, n_2-3} & B_{2, n_2-2} & B_{2, n_2-1} \\
B_{3,0} & B_{3,1} & B_{3,2} & 0 & 0 & \cdots & 0 & 0 & B_{3, n_2-2} & B_{3, n_2-1} \\
0 & 0 & 0 & 0 & 0 & \cdots & 0 & 0 & 0 & 0 \\
\vdots & \vdots & \vdots & \vdots & \vdots & \ddots & \vdots & \vdots & \vdots & \vdots \\
0 & 0 & 0 & 0 & 0 & \cdots & 0 & 0 & 0 & 0 \\
B_{n_1-3, 0} & B_{n_1-3, 1} & B_{n_1-3, 2} & 0 & 0 & \cdots & 0 & 0 & B_{n_1-3, n_2-2} & B_{n_1-3, n_2-1} \\
B_{n_1-2, 0} & B_{n_1-2, 1} & B_{n_1-2, 2} & B_{n_1-2, 3} & 0 & \cdots & 0 & B_{n_1-2, n_2-3} & B_{n_1-2, n_2-2} & B_{n_1-2, n_2-1} \\
B_{n_1-1, 0} & B_{n_1-1, 1} & B_{n_1-1, 2} & B_{n_1-1, 3} & 0 & \cdots & 0 & B_{n_1-1, n_2-3} & B_{n_1-1, n_2-2} & B_{n_1-1, n_2-1}
\end{pmatrix} \quad (28)$$

$$= \begin{pmatrix} \alpha & \beta & \gamma & \delta & 0 & \ldots & 0 & \delta & \gamma & \beta \\ \beta & \eta & \lambda & \mu & 0 & \ldots & 0 & \mu & \lambda & \eta \\ \gamma & \lambda & \rho & \sigma & 0 & \ldots & 0 & \sigma & \rho & \lambda \\ \delta & \mu & \sigma & 0 & 0 & \ldots & 0 & 0 & \sigma & \mu \\ 0 & 0 & 0 & 0 & 0 & \ldots & 0 & 0 & 0 & 0 \\ \vdots & \vdots & \vdots & \vdots & \vdots & \ddots & \vdots & \vdots & \vdots & \vdots \\ 0 & 0 & 0 & 0 & 0 & \ldots & 0 & 0 & 0 & 0 \\ \delta & \mu & \sigma & 0 & 0 & \ldots & 0 & 0 & \sigma & \mu \\ \gamma & \lambda & \rho & \sigma & 0 & \ldots & 0 & \sigma & \rho & \lambda \\ \beta & \eta & \lambda & \mu & 0 & \ldots & 0 & \mu & \lambda & \eta \end{pmatrix},$$

where $0 \leq s_i \leq n_i-1$ for $i=1,2$, to obtain $B_{s_1,s_2}$;

means for computing the 2-D FFT of $Y_{j_1,j_2}$ and $B_{s_1,s_2}$ to obtain $\tilde{Y}_{m,n}$ and $\tilde{B}_{m,n}$, respectively;

means for computing $\tilde{X}_{m,n} = \tilde{Y}_{m,n}/\tilde{B}_{m,n}$; and means for computing the inverse FFT of $\tilde{Y}_{m,n}$ to obtain a compressed image $X_{k_1,k_2}$.

31. The encoder of claim 30 further comprising a decoder having means for applying $X_{k_1,k_2}$ in $$\sum_{k_1=0}^{n_1-1} \sum_{k_2=0}^{n_2-1} X_{k_1,k_2} A_{j_1,j_2,k_1,k_2} = Y_{j_1,j_2},$$

$0 \leq j_i \leq n_i-1$ and $i=1,2$. (21) to perform a 2-D convolution of $X_{k_1,k_2}$ and $R(t_1,t_2)$ given by $R(t_1,t_2)=R(t_1) \cdot R(t_2)$ to obtain a 2-D reconstructed image $S(t_1,t_2)$.

32. The encoder of claim 30, wherein $\tau=2$.

33. The encoder of claim 30, wherein $\tau=3$.

34. The encoder of claim 30, wherein $\sigma=0$.

35. The encoder of claim 30, wherein $\sigma=\mu=0$.

36. The encoder of claim 30, wherein $\eta=\lambda=\rho=\mu=\sigma=0$.

37. A method performed by a computer for coding an image $X(t_1,t_2)$ comprising the steps of:

applying a zonal filter $R(m_1,m_2)$ to the image $X(t_1,t_2)$ where $$Y_{j_1,j_2} = \sum_{m_1=-2\tau+1}^{2\tau-1} \sum_{m_2=-2\tau+1}^{2\tau-1} X(m_1+j_1\tau, m_2+j_2\tau)R(m_1,m_2), \quad (25)$$

to compute $Y_{j_1,j_2}$;

applying $$A_{j_1,j_2,k_1,k_2} = \sum_{m_1=-2\tau+1}^{2\tau-1} \sum_{m_2=-2\tau+1}^{2\tau-1} R(m_1+(j_1-k_1)\tau, m_2+(j_2-k_2)\tau)R(m_1,m_2)$$

$$= \begin{cases} \sum_{m_1,m_2=-2\tau+1}^{2\tau-1} (R(m_1,m_2))^2 = \alpha & \text{if } j_1-k_1 \equiv 0 \bmod n_1 \text{ and } j_2-k_2 \equiv 0 \bmod n_2 \\[6pt] \sum_{m_1,m_2=-2\tau+1}^{2\tau-1} R(m_1 \pm \tau, m_2)R(m_1,m_2) = \beta & \text{if } j_1-k_1 \equiv \pm 1 \bmod n_1 \text{ and } j_2-k_2 \equiv 0 \bmod n_2 \\ & \text{or } j_1-k_1 \equiv 0 \bmod n_1 \text{ and } j_2-k_2 \equiv \pm 1 \bmod n_2 \\[6pt] \sum_{m_1,m_2=-2\tau+1}^{2\tau-1} R(m_1 \pm 2\tau, m_2)R(m_1,m_2) = \gamma & \text{if } j_1-k_1 \equiv \pm 2 \bmod n_1 \text{ and } j_2-k_2 \equiv 0 \bmod n_2 \\ & \text{or } j_1-k_1 \equiv 0 \bmod n_1 \text{ and } j_2-k_2 \equiv \pm 2 \bmod n_2 \\[6pt] \sum_{m_1,m_2=-2\tau+1}^{2\tau-1} R(m_1 \pm 3\tau, m_2)R(m_1,m_2) = \delta & \text{if } j_1-k_1 \equiv \pm 3 \bmod n_1 \text{ and } j_2-k_2 \equiv 0 \bmod n_2 \\ & \text{or } j_1-k_1 \equiv 0 \bmod n_1 \text{ and } j_2-k_2 \equiv \pm 3 \bmod n_2 \\[6pt] \sum_{m_1,m_2=-2\tau+1}^{2\tau-1} R(m_1 \pm \tau, m_2 \pm \tau)R(m_1,m_2) = \eta & \text{if } j_1-k_1 \equiv \pm 1 \bmod n_1 \text{ and } j_2-k_2 \equiv \pm 1 \bmod n_2 \\[6pt] \sum_{m_1,m_2=-2\tau+1}^{2\tau-1} R(m_1 \pm 2\tau, m_2 \pm \tau)R(m_1,m_2) = \lambda & \text{if } j_1-k_1 \equiv \pm 2 \bmod n_1 \text{ and } j_2-k_2 \equiv \pm 1 \bmod n_2 \\ & \text{or } j_1-k_1 \equiv \pm 1 \bmod n_1 \text{ and } j_2-k_2 \equiv \pm 2 \bmod n_2 \\[6pt] \sum_{m_1,m_2=-2\tau+1}^{2\tau-1} R(m_1 \pm 3\tau, m_2 \pm \tau)R(m_1,m_2) = \mu & \text{if } j_1-k_1 \equiv \pm 3 \bmod n_1 \text{ and } j_2-k_2 \equiv \pm 1 \bmod n_2 \\ & \text{or } j_1-k_1 \equiv \pm 1 \bmod n_1 \text{ and } j_2-k_2 \equiv \pm 3 \bmod n_2 \\[6pt] \sum_{m_1,m_2=-2\tau+1}^{2\tau-1} R(m_1 \pm 2\tau, m_2 \pm 2\tau)R(m_1,m_2) = \rho & \text{if } j_1-k_1 \equiv \pm 2 \bmod n_1 \text{ and } j_2-k_2 \equiv \pm 2 \bmod n_2 \\[6pt] \sum_{m_1,m_2=-2\tau+1}^{2\tau-1} R(m_1 \pm 3\tau, m_2 \pm 2\tau)R(m_1,m_2) = \sigma & \text{if } j_1-k_1 \equiv \pm 3 \bmod n_1 \text{ and } j_2-k_2 \equiv \pm 2 \bmod n_2 \\ & \text{or } j_1-k_1 \equiv \pm 2 \bmod n_1 \text{ and } j_2-k_2 \equiv \pm 3 \bmod n_2 \\[6pt] 0 & \text{otherwise} \end{cases}$$

where, the array $A_{j_1j_2,k_1k_2}$ can be expressed in 2-D circulant form as $$A_{j_1j_2,k_1k_2} = B_{(k_1-j_1)n_1,(k_2-j_2)n_2}, \quad (27)$$

and where $(k_i-j_i)_{n_i}$ denotes the residue $(k_i-j_i)$ modulo $n_i$ for $i=1,2$ and $$[B_{s_1,s_2}] = \begin{pmatrix} B_{0,0} & B_{0,1} & B_{0,2} & B_{0,3} & 0 & \ldots & 0 & B_{0,n_2-3} & B_{0,n_2-2} & B_{0,n_2-1} \\ B_{1,0} & B_{1,1} & B_{1,2} & B_{1,3} & 0 & \ldots & 0 & B_{1,n_2-3} & B_{1,n_2-2} & B_{1,n_2-1} \\ B_{2,0} & B_{2,1} & B_{2,2} & B_{2,3} & 0 & \ldots & 0 & B_{2,n_2-3} & B_{2,n_2-2} & B_{2,n_2-1} \\ B_{3,0} & B_{3,1} & B_{3,2} & 0 & 0 & \ldots & 0 & 0 & B_{3,n_2-2} & B_{3,n_2-1} \\ 0 & 0 & 0 & 0 & 0 & \ldots & 0 & 0 & 0 & 0 \\ \vdots & \vdots & \vdots & \vdots & \vdots & \ddots & \vdots & \vdots & \vdots & \vdots \\ 0 & 0 & 0 & 0 & 0 & \ldots & 0 & 0 & 0 & 0 \\ B_{n_1-3,0} & B_{n_1-3,1} & B_{n_1-3,2} & 0 & 0 & \ldots & 0 & 0 & B_{n_1-3,n_2-2} & B_{n_1-3,n_2-1} \\ B_{n_1-2,0} & B_{n_1-2,1} & B_{n_1-2,2} & B_{n_1-2,3} & 0 & \ldots & 0 & B_{n_1-2,n_2-3} & B_{n_1-2,n_2-2} & B_{n_1-2,n_2-1} \\ B_{n_1-1,0} & B_{n_1-1,1} & B_{n_1-1,2} & B_{n_1-1,3} & 0 & \ldots & 0 & B_{n_1-1,n_2-3} & B_{n_1-1,n_2-2} & B_{n_1-1,n_2-1} \end{pmatrix} \quad (28)$$

$$= \begin{pmatrix} \alpha & \beta & \gamma & \delta & 0 & \ldots & 0 & \delta & \gamma & \beta \\ \beta & \eta & \lambda & \mu & 0 & \ldots & 0 & \mu & \lambda & \eta \\ \gamma & \lambda & \rho & \sigma & 0 & \ldots & 0 & \sigma & \rho & \lambda \\ \delta & \mu & \sigma & 0 & 0 & \ldots & 0 & 0 & \sigma & \mu \\ 0 & 0 & 0 & 0 & 0 & \ldots & 0 & 0 & 0 & 0 \\ \vdots & \vdots & \vdots & \vdots & \vdots & \ddots & \vdots & \vdots & \vdots & \vdots \\ 0 & 0 & 0 & 0 & 0 & \ldots & 0 & 0 & 0 & 0 \\ \delta & \mu & \sigma & 0 & 0 & \ldots & 0 & 0 & \sigma & \mu \\ \gamma & \lambda & \rho & \sigma & 0 & \ldots & 0 & \sigma & \rho & \lambda \\ \beta & \eta & \lambda & \mu & 0 & \ldots & 0 & \mu & \lambda & \eta \end{pmatrix},$$

where $0 \leq s_i \leq n_i-1$ for $i=1,2$, to compute $B_{s_1,s_2}$;
  where constants $\alpha,\beta,\gamma,\delta,\eta,\lambda,\rho,\mu,$ and $\sigma$ are autocorrelation coefficients between zonal filter $R(m_1,m_2)$;
  dividing all of the coefficients $B_{s_1,s_2}$ into respective overlapping sub-images of $B_{s_1,s_2}$ with a border of width 2;
  computing a Winograd discrete Fourier transform (WDFT) of all overlapping sub-images of $B_{s_1,s_2}$ to obtain coefficients, $\tilde{B}_{m,n}$;
  dividing all of the coefficients $Y_{j_1,j_2}$ into respective overlapping sub-images of $Y_{j_1,j_2}$ with a border of width 2;
  computing a WDFT of all overlapping sub-images of $Y_{j_1,j_2}$ to obtain transforms of respective sub-images of $\tilde{Y}_{m,n}$;
  computing $\tilde{X}_{m,n} = \tilde{Y}_{m,n}/\tilde{B}_{m,n}$ to obtain each sub-image of $\tilde{X}_{m,n}$;
  computing an inverse WDFT of all of the sub-images of $\tilde{X}_{m,n}$ to obtain sub-images of $X_{k_1,k_2}$;
  removing duplicate pixels in an overlapping border of two adjacent sub-images of $X_{k_1,k_2}$; and
  combining each non-overlapping sub-image of $X_{k_1,k_2}$ to obtain the entire image of $X_{k_1,k_2}$.

38. The method of claim 37, wherein $\tau=2$.

39. The method of claim 37, wherein $\tau=3$.

40. The method of claim 37, wherein the autocorrelation coefficient between zonal filter $\sigma=0$.

41. The method of claim 37, wherein autocorrelation coefficients between zonal filter $\sigma=\mu=0$.

42. The method of claim 37, wherein autocorrelation coefficients between zonal filter $\eta=\lambda=\rho=\mu=\sigma=0$.

43. The method of claim 37, wherein the WDFT is a 9×9 WDFT given by $$X(k) = \sum_{n=0}^{8} x(n)W^{nk}, \quad k=0,\ldots,8, \quad (41)$$

and the sub-images of $Y_{j_1,j_2}$ are 9×9.

44. The method of claim 37, wherein the WDFT is a 5×WDFT given by, $$X(k) = \sum_{n=0}^{4} x(n)W^{nk}, \quad k=0,\ldots,4, \quad (42)$$

and the sub-images of $Y_{j_1,j_2}$ are 5×5.

45. The method of claim 27 further comprising the step of:
applying $X_{k_1,k_2}$ in $$\sum_{k_1=0}^{n_1-1}\sum_{k_2=0}^{n_2-1} X_{k_1,k_2} A_{j_1j_2,k_1k_2} = Y_{j_1,j_2}, \quad (21)$$

$$0 \leq j_i \leq n_i - 1 \text{ and } i = 1, 2.$$

to perform a 2-D convolution of $X_{k_1,k_2}$ and $R(t_1,t_2)$ to obtain a 2-D reconstructed image $S(t_1,t_2)$.

46. A modified JPEG encoder for image compression comprising:
  means for applying a zonal filter $R(m_1,m_2)$ to an image $X(t_1,t_2)$ where $$Y_{j_1,j_2} = \sum_{m_1=-2\tau+1}^{2\tau-1} \sum_{m_2=-2\tau+1}^{2\tau-1} X(m_1+j_1\tau, m_2+j_2\tau)R(m_1,m_2), \quad (25)$$

to compute $Y_{j_1,j_2}$;

means for applying $$A_{j_1,j_2,k_1 k_2} = \sum_{m_1=-2\tau+1}^{2\tau-1} \sum_{m_2=-2\tau+1}^{2\tau-1} R(m_1 + (j_1-k_1)\tau, m_2 + (j_2-k_2)\tau) R(m_1, m_2)$$

$$= \begin{cases} \sum_{m_1,m_2=-2\tau+1}^{2\tau-1} (R(m_1,m_2))^2 = \alpha & \text{if } j_1-k_1 \equiv 0 \bmod n_1 \text{ and } j_2-k_2 \equiv 0 \bmod n_2 \\[6pt] \sum_{m_1,m_2=-2\tau+1}^{2\tau-1} R(m_1 \pm \tau, m_2) R(m_1, m_2) = \beta & \text{if } j_1-k_1 \equiv \pm 1 \bmod n_1 \text{ and } j_2-k_2 \equiv 0 \bmod n_2 \\ & \text{or } j_1-k_1 \equiv 0 \bmod n_1 \text{ and } j_2-k_2 \equiv \pm 1 \bmod n_2 \\[6pt] \sum_{m_1,m_2=-2\tau+1}^{2\tau-1} R(m_1 \pm 2\tau, m_2) R(m_1, m_2) = \gamma & \text{if } j_1-k_1 \equiv \pm 2 \bmod n_1 \text{ and } j_2-k_2 \equiv 0 \bmod n_2 \\ & \text{or } j_1-k_1 \equiv 0 \bmod n_1 \text{ and } j_2-k_2 \equiv \pm 2 \bmod n_2 \\[6pt] \sum_{m_1,m_2=-2\tau+1}^{2\tau-1} R(m_1 \pm 3\tau, m_2) R(m_1, m_2) = \delta & \text{if } j_1-k_1 \equiv \pm 3 \bmod n_1 \text{ and } j_2-k_2 \equiv 0 \bmod n_2 \\ & \text{or } j_1-k_1 \equiv 0 \bmod n_1 \text{ and } j_2-k_2 \equiv \pm 3 \bmod n_2 \\[6pt] \sum_{m_1,m_2=-2\tau+1}^{2\tau-1} R(m_1 \pm \tau, m_2 \pm \tau) R(m_1, m_2) = \eta & \text{if } j_1-k_1 \equiv \pm 1 \bmod n_1 \text{ and } j_2-k_2 \equiv \pm 1 \bmod n_2 \\[6pt] \sum_{m_1,m_2=-2\tau+1}^{2\tau-1} R(m_1 \pm 2\tau, m_2 \pm \tau) R(m_1, m_2) = \lambda & \text{if } j_1-k_1 \equiv \pm 2 \bmod n_1 \text{ and } j_2-k_2 \equiv \pm 1 \bmod n_2 \\ & \text{or } j_1-k_1 \equiv \pm 1 \bmod n_1 \text{ and } j_2-k_2 \equiv \pm 2 \bmod n_2 \\[6pt] \sum_{m_1,m_2=-2\tau+1}^{2\tau-1} R(m_1 \pm 3\tau, m_2 \pm \tau) R(m_1, m_2) = \mu & \text{if } j_1-k_1 \equiv \pm 3 \bmod n_1 \text{ and } j_2-k_2 \equiv \pm 1 \bmod n_2 \\ & \text{or } j_1-k_1 \equiv \pm 1 \bmod n_1 \text{ and } j_2-k_2 \equiv \pm 3 \bmod n_2 \\[6pt] \sum_{m_1,m_2=-2\tau+1}^{2\tau-1} R(m_1 \pm 2\tau, m_2 \pm 2\tau) R(m_1, m_2) = \rho & \text{if } j_1-k_1 \equiv \pm 2 \bmod n_1 \text{ and } j_2-k_2 \equiv \pm 2 \bmod n_2 \\[6pt] \sum_{m_1,m_2=-2\tau+1}^{2\tau-1} R(m_1 \pm 3\tau, m_2 \pm 2\tau) R(m_1, m_2) = \sigma & \text{if } j_1-k_1 \equiv \pm 3 \bmod n_1 \text{ and } j_2-k_2 \equiv \pm 2 \bmod n_2 \\ & \text{or } j_1-k_1 \equiv \pm 2 \bmod n_1 \text{ and } j_2-k_2 \equiv \pm 3 \bmod n_2 \\[6pt] 0 & \text{otherwise} \end{cases}$$

where, the array $A_{j_1 j_2, k_1 k_2}$ can be expressed in 2-D circulant form as $$A_{j_1 j_2, k_1 k_2} = B_{(k_1-j_1)_{n_1},\, (k_2-j_2)_{n_2}} \qquad , (27)$$

and where $(k_i-j_i)_{n_i}$ denotes the residue $(k_i-j_i)$ modulo $n_i$ for $i=1,2$ and $$[B_{s_1,s_2}] = \begin{pmatrix} B_{0,0} & B_{0,1} & B_{0,2} & B_{0,3} & 0 & \ldots & 0 & B_{0,n_2-3} & B_{0,n_2-2} & B_{0,n_2-1} \\ B_{1,0} & B_{1,1} & B_{1,2} & B_{1,3} & 0 & \ldots & 0 & B_{1,n_2-3} & B_{1,n_2-2} & B_{1,n_2-1} \\ B_{2,0} & B_{2,1} & B_{2,2} & B_{2,3} & 0 & \ldots & 0 & B_{2,n_2-3} & B_{2,n_2-2} & B_{2,n_2-1} \\ B_{3,0} & B_{3,1} & B_{3,2} & 0 & 0 & \ldots & 0 & 0 & B_{3,n_2-2} & B_{3,n_2-1} \\ 0 & 0 & 0 & 0 & 0 & \ldots & 0 & 0 & 0 & 0 \\ \vdots & \vdots & \vdots & \vdots & \vdots & \ddots & \vdots & \vdots & \vdots & \vdots \\ 0 & 0 & 0 & 0 & 0 & \ldots & 0 & 0 & 0 & 0 \\ B_{n_1-3,0} & B_{n_1-3,1} & B_{n_1-3,2} & 0 & 0 & \ldots & 0 & 0 & B_{n_1-3,n_2-2} & B_{n_1-3,n_2-1} \\ B_{n_1-2,0} & B_{n_1-2,1} & B_{n_1-2,2} & B_{n_1-2,3} & 0 & \ldots & 0 & B_{n_1-2,n_2-3} & B_{n_1-2,n_2-2} & B_{n_1-2,n_2-1} \\ B_{n_1-1,0} & B_{n_1-1,1} & B_{n_1-1,2} & B_{n_1-1,3} & 0 & \ldots & 0 & B_{n_1-1,n_2-3} & B_{n_1-1,n_2-2} & B_{n_1-1,n_2-1} \end{pmatrix} \quad (28)$$

-continued $$= \begin{pmatrix} \alpha & \beta & \gamma & \delta & 0 & \ldots & 0 & \delta & \gamma & \beta \\ \beta & \eta & \lambda & \mu & 0 & \ldots & 0 & \mu & \lambda & \eta \\ \gamma & \lambda & \rho & \sigma & 0 & \ldots & 0 & \sigma & \rho & \lambda \\ \delta & \mu & \sigma & 0 & 0 & \ldots & 0 & 0 & \sigma & \mu \\ 0 & 0 & 0 & 0 & 0 & \ldots & 0 & 0 & 0 & 0 \\ \vdots & \vdots & \vdots & \vdots & \vdots & \ddots & \vdots & \vdots & \vdots & \vdots \\ 0 & 0 & 0 & 0 & 0 & \ldots & 0 & 0 & 0 & 0 \\ \delta & \mu & \sigma & 0 & 0 & \ldots & 0 & 0 & \sigma & \mu \\ \gamma & \lambda & \rho & \sigma & 0 & \ldots & 0 & \sigma & \rho & \lambda \\ \beta & \eta & \lambda & \mu & 0 & \ldots & 0 & \mu & \lambda & \eta \end{pmatrix},$$

where $0 \leq s_i \leq n_i-1$ for i=1,2, to compute $B_{s_1,s_2}$;

where constants $\alpha,\beta,\lambda,\delta,\eta,\gamma,\rho,\mu$, and $\sigma$ are autocorrelation coefficients between zonal filter $R(m_1,m_2)$;

means for dividing all of the coefficients $B_{s_1,s_2}$ into respective overlapping sub-images of $B_{s_1,s_2}$ with a border of width 2;

means for computing a Winograd discrete Fourier transform (WDFT) of all overlapping sup-images of $B_{s_1,s_2}$ to obtain coefficients, $\tilde{B}_{m,n}$;

means for dividing all of the coefficients $Y_{j_1,j_2}$ into respective overlapping sub-images of $Y_{j_1,j_2}$ with a border of width 2;

means for computing a WDFT of all overlapping sub-images of $Y_{j_1,j_2}$ to obtain transforms of respective sub-images of $\tilde{Y}_{m,n}$;

means for computing $\tilde{X}_{m,n} = \tilde{Y}_{m,n}/\tilde{B}_{m,n}$ to obtain each sub-image of $\tilde{X}_{m,n}$;

means for computing an inverse WDFT of all of the sub-images of $\tilde{X}_{m,n}$ to obtain sub-images of $X_{k_1,k_2}$;

means for removing duplicate pixels in an overlapping border of two adjacent sub-images of $X_{k_1,k_2}$; and means for combining each non-overlapping sub-image of $X_{k_1,k_2}$ to obtain the entire image of $X_{k_1,k_2}$.

47. The encoder of claim 46, wherein τ=2.

48. The encoder of claim 46, wherein τ=3.

49. The encoder of claim 46, wherein the autocorrelation coefficient betwen zonal filter σ=0.

50. The encoder of claim 46, wherein autocorrelation coefficients between zonal filter σ=μ=0.

51. The encoder of claim 46, wherein autocorrelation coefficients between zonal filter η=λ=ρ=μ=σ=0.

52. The encoder of claim 46, wherein the WDFT is a 9×9 WDFT given by $$X(k) = \sum_{n=0}^{8} x(n) W^{nk}, \quad k = 0, \ldots, 8, \tag{41}$$

and the sub-images of $Y_{j_1,j_2}$ are 9×9.

53. The encoder of claim 46, wherein the WDFT is a 5×5 WDFT given by, $$X(k) = \sum_{n=0}^{4} x(n) W^{nk}, \quad k = 0, \ldots, 4, \tag{42}$$

and the sub-images of $Y_{j_1,j_2}$ are 5×5.

54. The encoder of claim 46, further comprising a decoder having means for applying $X_{k_1,k_2}$ in $$\sum_{k_1=0}^{n_1-1} \sum_{k_2=0}^{n_2-1} X_{k_1,k_2} A_{j_1,j_2,k_1,k_2} = Y_{j_1,j_2},$$

$0 \leq j_i \leq n_i-1$ and i=1,2. to perform a 2-D convolution of $X_{k_1,k_2}$ and $R(t_1,t_2)$ to obtain a 2-D reconstructed image.

* * * * *